US010049576B2

(12) United States Patent
Nakatani et al.

(10) Patent No.: US 10,049,576 B2
(45) Date of Patent: Aug. 14, 2018

(54) COLLISION AVOIDANCE SYSTEM AND COLLISION AVOIDANCE METHOD

(71) Applicant: The Yokohama Rubber Co., LTD., Minato-ku, Tokyo (JP)

(72) Inventors: Koji Nakatani, Hiratsuka (JP); Hiroshi Saegusa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/508,087

(22) PCT Filed: Sep. 5, 2014

(86) PCT No.: PCT/JP2014/073566
§ 371 (c)(1),
(2) Date: Mar. 1, 2017

(87) PCT Pub. No.: WO2016/035215
PCT Pub. Date: Mar. 10, 2016

(65) Prior Publication Data
US 2017/0294127 A1    Oct. 12, 2017

(51) Int. Cl.
*G08G 1/16*    (2006.01)
(52) U.S. Cl.
CPC .............. *G08G 1/166* (2013.01); *G08G 1/167* (2013.01); *B60R 2300/804* (2013.01); *B60R 2300/8066* (2013.01)
(58) Field of Classification Search
CPC ................... G08G 1/166; G08G 1/167; B60R 2300/8066; B60R 2300/804
(Continued)

(56) References Cited

U.S. PATENT DOCUMENTS 5,729,216 A * 3/1998 Sasaki ................... B60Q 9/008
340/903
6,218,960 B1 * 4/2001 Ishikawa ................ G08G 1/167
340/435
(Continued)

FOREIGN PATENT DOCUMENTS

JP    S58-078256    5/1983
JP    S60-024479    2/1985
(Continued)

OTHER PUBLICATIONS

International Search Report for International Application No. PCT/JP2014/073566 dated Dec. 9, 2014, 6 pages, Japan.

*Primary Examiner* — John A Tweel, Jr.
(74) *Attorney, Agent, or Firm* — Thorpe North & Western

(57) ABSTRACT

A collision avoidance system is provided with: a rear detection device arranged in a host vehicle and capable of detecting an object directly behind the host vehicle, an object to the rear-right of the host vehicle, and an object to the rear-left of the host vehicle in a non-contact manner. A computation processing unit outputs, on the basis of a detection result from the rear detection device, the presence/absence of the possibility of a collision between the host vehicle and: a first following vehicle approaching the host vehicle from directly behind, a second following vehicle approaching the host vehicle from the rear-right, and a third following vehicle approaching the host vehicle from the rear-left. A warning device generates warnings when there is the possibility of a collision with the first, second or third following vehicles.

22 Claims, 18 Drawing Sheets

(58) Field of Classification Search
USPC .......................................................... 340/435
See application file for complete search history.

(56) References Cited

U.S. PATENT DOCUMENTS

| | | | |
|---|---|---|---|
| 6,268,803 B1* | 7/2001 | Gunderson | G08G 1/166 |
| | | | 180/168 |
| 6,292,111 B1* | 9/2001 | Ishikawa | G08G 1/167 |
| | | | 180/167 |
| 6,388,565 B1 | 5/2002 | Bernhard et al. | |
| 9,139,135 B2* | 9/2015 | Assaf | G08G 1/167 |
| 2002/0087269 A1* | 7/2002 | Sasaki | G08G 1/163 |
| | | | 701/301 |
| 2002/0147534 A1 | 10/2002 | Delcheccolo et al. | |
| 2011/0010041 A1 | 1/2011 | Wagner et al. | |
| 2014/0071278 A1 | 3/2014 | Assaf | |

FOREIGN PATENT DOCUMENTS

| | | |
|---|---|---|
| JP | H01-321600 | 12/1987 |
| JP | H05-024492 | 2/1993 |
| JP | H08-160138 | 6/1996 |
| JP | H08-193831 | 7/1996 |
| JP | H11-321495 | 11/1999 |
| JP | 2001-010433 | 1/2001 |
| JP | 2003-132498 | 5/2003 |
| JP | 2007-147579 | 6/2007 |
| JP | 2009-122917 | 6/2009 |
| JP | 2014-102770 | 6/2014 |
| WO | WO 2003/016943 | 2/2003 |
| WO | WO 2014/076841 | 5/2014 |

* cited by examiner

VOICE: "DANGER DIRECTLY BEHIND!"

VOICE: "DANGER TO THE REAR-RIGHT!"

VOICE: "DANGER TO THE REAR-LEFT!"

COLLISION AVOIDANCE SYSTEM AND COLLISION AVOIDANCE METHOD

TECHNICAL FIELD

The present technology relates to a collision avoidance system and a collision avoidance method.

BACKGROUND ART

A collision avoidance system for avoiding a collision between a host vehicle and a following vehicle is known as a collision avoidance system. As an example of a collision avoidance system, Japanese Unexamined Patent Application Publication No. 2001-010433A discloses a lane change guidance device having an object detection device for detecting an object in a side-rear region of a vehicle and a warning instruction device activated when a following vehicle is detected.

SUMMARY

A collision avoidance system for avoiding a collision between a host vehicle and a following vehicle includes a rear detection device that detects the following vehicle and a warning device that generates a warning for the following vehicle or a driver. The following vehicle may be a following vehicle approaching the host vehicle from directly behind, a following vehicle approaching the host vehicle from the rear-right, or a following vehicle approaching the host vehicle from the rear-left. Thus to avoid a collision, what is needed is a technique capable of correctly understanding the state of the following vehicle and suppressing the occurrence of unnecessary warnings.

The present technology provides a collision avoidance system and a collision avoidance method capable of correctly understanding the state of a following vehicle and suppressing the occurrence of unnecessary warnings.

A first aspect of the present technology provides a collision avoidance system including a rear detection device, a computation processing unit, and a warning device. The rear detection device is arranged in a host vehicle and capable of detecting an object directly behind the host vehicle, an object to rear-right of the host vehicle, and an object to rear-left of the host vehicle in a non-contact manner. A computation processing unit, on the basis of a detection result from the rear detection device, outputs presence/absence of a possibility of a collision between the host vehicle and a first following vehicle approaching the host vehicle from directly behind, presence/absence of a possibility of a collision between the host vehicle and a second following vehicle approaching the host vehicle from the rear-right, and presence/absence of a possibility of a collision between the host vehicle and a third following vehicle approaching the host vehicle from the rear-left. The warning device, on the basis of an output result from the computation processing unit, generates a first warning when there is the possibility of a collision with the first following vehicle, generates a second warning when there is the possibility of a collision with the second following vehicle, and generates a third warning when there is the possibility of a collision with the third following vehicle.

In the first aspect of the present technology, the computation processing unit may estimate a first amount of time from a point in time when the rear detection device detects the first following vehicle to when the first following vehicle and the host vehicle collide, a second amount of time from a point in time when the rear detection device detects the second following vehicle to when the second following vehicle and the host vehicle collide, and a third amount of time from a point in time when the rear detection device detects the third following vehicle to when the third following vehicle and the host vehicle collide. The computation processing unit, on the basis of the results that are estimated, output a first risk level of the host vehicle and the first following vehicle colliding, a second risk level of the host vehicle and the second following vehicle colliding, and a third risk level of the host vehicle and the third following vehicle colliding. The system may further include a comparison unit that compares the first risk level, the second risk level, and the third risk level. On the basis of a comparison result from the comparison unit, the warning device may generate the first warning when the first risk level is highest, generate the second warning when the second risk level is highest, and generate the third warning when the third risk level is highest.

In the first aspect of the present technology, the system may further include a front detection device, a selection unit, and a guidance unit. The front detection device is arranged in the host vehicle and capable of detecting an object directly in front of the host vehicle, an object to front-right of the host vehicle, and an object to front-left of the host vehicle in a non-contact manner. The selection unit, on the basis of detection results from the rear detection device and the front detection device, selects a space from, a space directly in front, a space to the front-right, and a space to the front-left, in which no object is present. The guidance unit guides the host vehicle into the space selected by the selection unit.

In the first aspect of the present technology, the guidance unit may include at least one of an instruction output unit and a driving control unit. The instruction output unit is arranged within the host vehicle and instructs a driver of a target advancement direction of the host vehicle. The driving control unit controls a driving apparatus of the host vehicle.

In the first aspect of the present technology, a warning generated by the warning device may include sound, an image, or both.

In the first aspect of the present technology, the rear detection device may include a first detector having a first detection range and capable of detecting an object directly behind, a second detector having a second detection range and capable of detecting an object to the rear-right, and a third detector having a third detection range capable of detecting an object to the rear-left. The system may further include a rear detection device control unit and a direction indicator operation unit. The rear detection device control unit is capable of switching each of the first detector, the second detector, and the third detector from an active state to an inactive state and vice versa. The direction indicator operation unit operates a direction indicator of the host vehicle. The rear detection device control unit may switch at least one of the second detector and the third detector in the inactive state to the active state on the basis of an operation signal outputted from the direction indicator operation unit.

In the first aspect of the present technology, the system may further include a cancellation unit that outputs a cancellation signal that cancels the operation signal outputted from the direction indicator operation unit upon the host vehicle changing from a non-straight traveling state to a straight traveling state. The rear detection device control unit may switch at least one of the second detector and the third detector in the active state to the inactive state on the basis of the cancellation signal outputted from the cancellation unit.

In the first aspect of the present technology, the rear detection device control unit may keep the first detector in the active state both before the operation signal is outputted and after the cancellation signal has been outputted.

In the first aspect of the present technology, the rear detection device may include a first detector having a first detection range capable of detecting an object directly behind, a second detector having a second detection range capable of detecting an object to the rear-right, and a third detector having a third detection range capable of detecting an object to the rear-left. The system may further include a rear detection device control unit and a steering operation unit. The rear detection device control unit is capable of switching each of the first detector, the second detector, and the third detector from an active state to an inactive state and vice versa. The steering operation unit operates a steering apparatus of the host vehicle. The rear detection device control unit may switch at least one of the second detector and the third detector in the inactive state to the active state upon it being determined that the host vehicle has changed from the straight traveling state to the non-straight traveling state, the determination being made on the basis of an operation amount of the steering operation unit.

In the first aspect of the present technology, the rear detection device control unit may switch at least one of the second detector and the third detector in the active state to the inactive state upon it being determined, on the basis of the operation amount of the steering operation unit, that the host vehicle has changed from the non-straight traveling state to the straight traveling state.

In the first aspect of the present technology, the rear detection device control unit may keep the first detector in the active state both before the host vehicle changes from the straight traveling state to the non-straight traveling state and after the host vehicle has changed from the non-straight traveling state to the straight traveling state.

In the first aspect of the present technology, the rear detection device may have a detection range capable of detecting an object directly behind, an object to the rear-right, and an object to the rear-left. The system may further include a specific region setting unit and a direction indicator operation unit. The specific region setting unit is capable of switching each of a first specific region extending directly behind, a second specific region extending to the rear-right, and a third specific region extending to the rear-left from a set state to an unset state and vice versa in the detection range on the basis of a detection result from the rear detection device. The direction indicator operation unit operates a direction indicator of the host vehicle. The specific region setting unit may switch at least one of the second specific region and the third specific region in the unset state to the set state on the basis of an operation signal outputted from the direction indicator operation unit. The computation processing unit may output presence/absence of a possibility of a collision with the first following vehicle present in the first specific region, presence/absence of a possibility of a collision with the second following vehicle present in the second specific region, and presence/absence of a possibility of a collision with the third following vehicle present in the third specific region, on the basis of the detection result from the rear detection device.

In the first aspect of the present technology, the system may further include a cancellation unit that outputs a cancellation signal that cancels the operation signal outputted from the direction indicator operation unit upon the host vehicle changing from a non-straight traveling state to a straight traveling state. The specific region setting unit may switch at least one of the second specific region and the third specific region in the set state to the unset state on the basis of the cancellation signal outputted from the cancellation unit.

In the first aspect of the present technology, the specific region setting unit may keep the first specific region in the set state both before the operation signal is outputted and after the cancellation signal has been outputted.

In the first aspect of the present technology, the rear detection device may have a detection range capable of detecting an object directly behind, an object to the rear-right, and an object to the rear-left. The system may further include a specific region setting unit and a steering operation unit. The specific region setting unit is capable of switching each of a first specific region extending directly behind, a second specific region extending to the rear-right, and a third specific region extending to the rear-left from a set state to an unset state and vice versa in the detection range on the basis of a detection result from the rear detection device. The steering operation unit operates a steering apparatus of the host vehicle. The specific region setting unit may switch at least one of the second specific region and the third specific region in the unset state to the set state upon it being determined that the host vehicle has changed from a straight traveling state to a non-straight traveling state, the determination being made on the basis of an operation amount of the steering operation unit. The computation processing unit may output presence/absence of a possibility of a collision with the first following vehicle present in the first specific region, presence/absence of a possibility of a collision with the second following vehicle present in the second specific region, and presence/absence of a possibility of a collision with the third following vehicle present in the third specific region, on the basis of the detection result from the rear detection device.

In the first aspect of the present technology, the specific region setting unit may switch at least one of the second specific region and the third specific region in the set state to the unset state upon it being determined, on the basis of the operation amount of the steering operation unit, that the host vehicle has changed from the non-straight traveling state to the straight traveling state.

In the first aspect of the present technology, the specific region setting unit may keep the first specific region in the set state both before the host vehicle changes from the straight traveling state to the non-straight traveling state and after the host vehicle has changed from the non-straight traveling state to the straight traveling state.

In the first aspect of the present technology, the system may further include a two-wheeled vehicle determination unit and a two-wheeled vehicle warning device. The two-wheeled vehicle determination unit determines whether or not the third following vehicle is a two-wheeled vehicle on the basis of the detection result from the rear detection device. The two-wheeled vehicle warning device generates a warning for the two-wheeled vehicle when the host vehicle is to turn left upon it being determined, on the basis of a determination result from the two-wheeled vehicle determination unit, that the third following vehicle is a two-wheeled vehicle.

A second aspect of the present technology provides a collision avoidance method including the steps of: detecting an object directly behind the host vehicle, an object to rear-right of the host vehicle, and an object to rear-left of the host vehicle in a non-contact manner using a rear detection device arranged in a host vehicle; determining, on the basis of a detection result from the rear detection device, presence/ absence of a possibility of a collision with a first following vehicle approaching the host vehicle from directly behind, presence/absence of a possibility of a collision with a second following vehicle approaching the host vehicle from the rear-right, and presence/absence of a possibility of a collision with a third following vehicle approaching the host vehicle from the rear-left; and generating a first warning when there is a possibility of a collision with the first following vehicle, generating a second warning when there is a possibility of a collision with the second following vehicle, and generating a third warning when there is a possibility of a collision with the third following vehicle, on the basis of a result of the determination, using a warning device arranged in the host vehicle.

According to embodiments of the present technology, a collision avoidance system and a collision avoidance method capable of correctly understanding the state of a following vehicle and suppressing the occurrence of unnecessary warnings is provided.

DETAILED DESCRIPTION

Embodiments according to the present technology will be described with reference to the appended drawings. However, the present technology is not limited to those embodiments. The constituent elements of the embodiments described below can be combined with one another as appropriate. In addition, there are also cases where some of the constituent elements are not used.

First Embodiment

Figure 1:
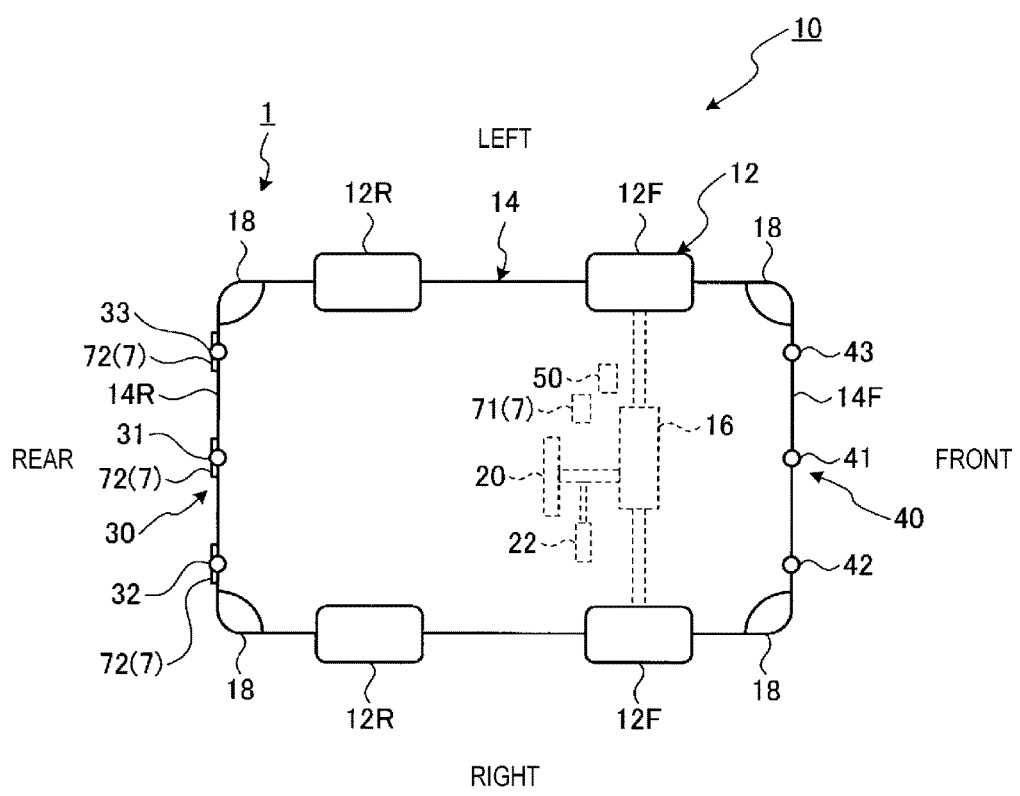
FIG. 1 is a schematic diagram illustrating an example of a vehicle according to a first embodiment.

A first embodiment will now be described. FIG. 1 is a schematic diagram illustrating an example of a vehicle 10 according to the present embodiment. The vehicle 10 has a collision avoidance system 1 for avoiding a collision with another vehicle that is present behind the vehicle 10 (a following vehicle). In the descriptions below, the vehicle 10 will be referred to as a host vehicle 10 as appropriate, and other vehicles present behind the host vehicle 10 will be referred to as following vehicles as appropriate.

The collision avoidance system 1 reduces damage caused by collisions between the host vehicle 10 and following vehicles. The collision avoidance system 1 prevents collisions between the host vehicle 10 and following vehicles.

The host vehicle 10 includes: a driving apparatus 12 including front wheels 12F and rear wheels 12R; a vehicle body 14 supported by the driving apparatus 12; a steering apparatus 16 capable of changing an advancement direction of the host vehicle 10; direction indicators (turn signals) 18 indicating the advancement direction of the host vehicle 10 to the exterior of the host vehicle 10; a steering operation unit 20 that operates the steering apparatus 16 of the host vehicle 10; a direction indicator operation unit 22 that operates the direction indicators 18; and a control device 50 that controls the host vehicle 10. The control device 50 includes an Engine Control Unit (ECU).

In the present embodiment, the host vehicle 10 is a four-wheeled vehicle. The host vehicle 10 has two front wheels 12F and two rear wheels 12R.

The host vehicle 10 has a driver cab that a driver occupies. The steering operation unit 20 and the direction indicator operation unit 22 are arranged in the driver cab. The steering operation unit 20 and the direction indicator operation unit 22 are operated by the driver. The steering operation unit 20 includes a steering wheel. The direction indicator operation unit 22 includes an operation lever arranged on a steering column.

The steering apparatus 16 includes a rack and pinion mechanism, and can change an orientation of the front wheels 12F as a result of the steering operation unit 20 being operated. The advancement direction of the host vehicle 10 is changed as a result of the orientation of the front wheels 12F being changed by the steering apparatus 16. The steering apparatus 16 can change the advancement direction of the host vehicle 10 from a straight traveling state to a non-straight traveling state and vice versa.

The direction indicators 18 are at least partially arranged on an outer surface of the host vehicle 10. The direction indicators 18 indicate the advancement direction of the host vehicle 10 to the exterior of the host vehicle 10 when the host vehicle 10 turns left or right or when changing course. The direction indicators 18 include lamps capable of flashing. The direction indicators 18 are activated by the direction indicator operation unit 22 being operated. The direction indicators 18 are arranged in both a front part 14F and a rear part 14R of the vehicle body 14. The direction indicators 18 are also arranged in both a right part and a left part of the vehicle body 14. When the driver turns the host vehicle 10 to the right, s/he operates the direction indicator operation unit 22 such that the direction indicators 18 arranged on the right part of the vehicle body 14 are activated (flash). Likewise, when the driver turns the host vehicle 10 to the left, s/he operates the direction indicator operation unit 22 such that the direction indicators 18 arranged on the left part of the vehicle body 14 are activated (flash).

The host vehicle 10 includes a rear detection device 30 capable of detecting an object to the rear of the host vehicle 10 in a non-contact manner. The rear detection device 30 is arranged in the rear part 14R of the vehicle body 14 of the host vehicle 10. The rear of the host vehicle 10 includes directly behind the host vehicle 10, the rear-right of the host vehicle 10, and the rear-left of the host vehicle 10. The rear detection device 30 is capable of detecting an object directly behind (straight behind) the host vehicle 10, an object to the rear-right (diagonally behind on the right) of the host vehicle 10, and an object to the rear-left (diagonally behind on the left) of the host vehicle 10, in a non-contact manner.

The rear detection device 30 includes a radar device (a millimeter wave radar device, a Doppler radar device). The radar device is capable of detecting whether or not an object is present behind the host vehicle 10 by emitting radio waves (or ultrasonic waves) and then receiving the radio waves (or ultrasonic waves) reflected by the object. In addition to whether or not an object is present, the radar device is capable of detecting a relative position of the object (a relative distance and orientation) and a relative velocity of the object. Note that the rear detection device 30 may include at least one of a laser scanner and a three-dimensional rangefinder. The rear detection device 30 may include an imaging device (a camera) capable of detecting an object in a non-contact manner by acquiring an optical image of the object.

In the present embodiment, the rear detection device 30 includes a first detector 31 capable of detecting an object directly behind the host vehicle 10, a second detector 32 capable of detecting an object to the rear-right of the host vehicle 10, and a third detector 33 capable of detecting an object to the rear-left of the host vehicle 10. The first detector 31 is arranged in a central part of the vehicle body 14 with respect to a width direction of the vehicle body 14. The second detector 32 is arranged in the right part of the vehicle body 14 with respect to the width direction of the vehicle body 14. The third detector 33 is arranged in the left part of the vehicle body 14 with respect to the width direction of the vehicle body 14.

The host vehicle 10 includes a front detection device 40 capable of detecting an object to the front of the host vehicle 10 in a non-contact manner. The front detection device 40 is arranged in the front part 14F of the vehicle body 14 of the host vehicle 10. The front of the host vehicle 10 includes directly in front (straight in front) of the host vehicle 10, the front-right (diagonally in front on the right) of the host vehicle 10, and the front-left (diagonally in front on the left) of the host vehicle 10. The front detection device 40 is capable of detecting an object directly in front of the host vehicle 10, an object to the front-right of the host vehicle 10, and an object to the front-left of the host vehicle 10, in a non-contact manner.

The front detection device 40 includes a radar device (a millimeter wave radar device, a Doppler radar device). The radar device is capable of detecting whether or not an object is present in front of the host vehicle 10 by emitting radio waves (or ultrasonic waves) and then receiving the radio waves (or ultrasonic waves) reflected by the object. In addition to whether or not an object is present, the radar device is capable of detecting a relative position of the object (a relative distance and orientation) and a relative velocity of the object. Note that the front detection device 40 may include at least one of a laser scanner and a three-dimensional rangefinder. The front detection device 40 may include an imaging device (a camera) capable of detecting an object in a non-contact manner by acquiring an optical image of the object.

In the present embodiment, the front detection device 40 includes a fourth detector 41 capable of detecting an object directly in front of the host vehicle 10, a fifth detector 42 capable of detecting an object to the front-right of the host vehicle 10, and a sixth detector 43 capable of detecting an object to the front-left of the host vehicle 10. The fourth detector 41 is arranged in a central part of the vehicle body 14 with respect to the width direction of the vehicle body 14. The fifth detector 42 is arranged in the right part of the vehicle body 14 with respect to the width direction of the vehicle body 14. The sixth detector 43 is arranged in the left part of the vehicle body 14 with respect to the width direction of the vehicle body 14.

The host vehicle 10 includes a warning device 7 that generates a warning. The warning device 7 includes an internal warning device 71 and an external warning device 72. The internal warning device is arranged at a driver's seat and generates a warning exclusively for the driver. The external warning device 72 is arranged on an outer surface of the vehicle body 14 and generates a warning exclusively for a following vehicle. The internal warning device 71 generates the warning for the driver using sound, an image, or both. The external warning device 72 generates the warning for following vehicles 11 using sound, an image, or both.

Figure 2:
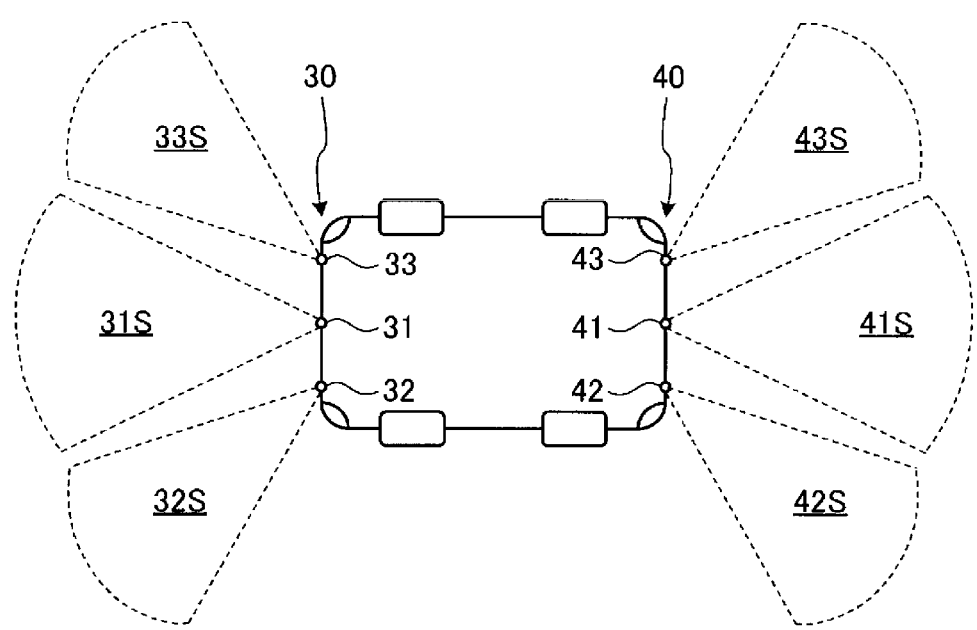
FIG. 2 is a diagram schematically illustrating an example of a rear detection device and a front detection device according to the first embodiment.

FIG. 2 is a diagram schematically illustrating an example of the rear detection device 30 and the front detection device 40. The rear detection device 30 is arranged in the rear part 14R of the vehicle body 14. The front detection device 40 is arranged in the front part 14F of the vehicle body 14. The rear detection device 30 includes the first detector 31 arranged in the central part of the vehicle body 14, the second detector 32 arranged in the right part of the vehicle body 14, and the third detector 33 arranged in the left part of the vehicle body 14. The front detection device 40 includes the fourth detector 41 arranged in the central part of the vehicle body 14, the fifth detector 42 arranged in the right part of the vehicle body 14, and the sixth detector 43 arranged in the left part of the vehicle body 14.

The first detector 31, the second detector 32, the third detector 33, the fourth detector 41, the fifth detector 42, and the sixth detector 43 each includes a radar device. Each radar device may include a Doppler radar device. Each radar device has an emitter that emits radio waves (or ultrasonic waves) and a receiver that receives the radio waves (or ultrasonic waves) reflected by an object, and is capable of detecting whether or not an object is present on the basis of the radio waves (or ultrasonic waves) received by the receiver. The first detector 31, the second detector 32, the third detector 33, the fourth detector 41, the fifth detector 42, and the sixth detector 43 each is capable of detecting a relative position of the object (a relative distance and orientation) and a relative velocity of the object.

The first detector 31 has a first detection range 31S capable of detecting an object directly behind the host vehicle 10. The first detection range 31S spreads out radially in vertical and horizontal directions from the emitter of the first detector 31 that emits radio waves (or ultrasonic waves). The first detector 31 is capable of detecting whether or not an object is present in the first detection range 31S. The first detector 31 is also capable of detecting the relative position and the relative velocity of an object present in the first detection range 31S.

The second detector 32 has a second detection range 32S capable of detecting an object to the rear-right of the host vehicle 10. The second detection range 32S spreads out radially in vertical and horizontal directions from the emitter of the second detector 32 that emits radio waves (or ultrasonic waves). The second detector 32 is capable of detecting whether or not an object is present in the second detection range 32S. The second detector 32 is also capable of detecting the relative position and the relative velocity of an object present in the second detection range 32S.

The third detector 33 has a third detection range 33S capable of detecting an object to the rear-left of the host vehicle 10. The third detection range 33S spreads out radially in vertical and horizontal directions from the emitter of the third detector 33 that emits radio waves (or ultrasonic waves). The third detector 33 is capable of detecting whether or not an object is present in the third detection range 33S. The third detector 33 is also capable of detecting the relative position and the relative velocity of an object present in the third detection range 33S.

The fourth detector 41 has a fourth detection range 41S capable of detecting an object directly in front of the host vehicle 10. The fourth detection range 41S spreads out radially in vertical and horizontal directions from the emitter of the fourth detector 41 that emits radio waves (or ultrasonic waves). The fourth detector 41 is capable of detecting whether or not an object is present in the fourth detection range 41S. The fourth detector 41 is also capable of detecting the relative position and the relative velocity of an object present in the fourth detection range 41S.

The fifth detector 42 has a fifth detection range 42S capable of detecting an object to the front-right of the host vehicle 10. The fifth detection range 42S spreads out radially in vertical and horizontal directions from the emitter of the fifth detector 42 that emits radio waves (or ultrasonic waves). The fifth detector 42 is capable of detecting whether or not an object is present in the fifth detection range 42S. The fifth detector 42 is also capable of detecting the relative position and the relative velocity of an object present in the fifth detection range 42S.

The sixth detector 43 has a sixth detection range 43S capable of detecting an object to the front-left of the host vehicle 10. The sixth detection range 43S spreads out radially in vertical and horizontal directions from the emitter of the sixth detector 43 that emits radio waves (or ultrasonic waves). The sixth detector 43 is capable of detecting whether or not an object is present in the sixth detection range 43S. The sixth detector 43 is also capable of detecting the relative position and the relative velocity of an object present in the sixth detection range 43S.

The first detection range 31S, the second detection range 32S, and the third detection range 33S are set to be substantially non-overlapping. Note, however, that the first detection range 31S and the second detection range 32S may at least partially overlap. The first detection range 31S and the third detection range 33S may also at least partially overlap. The second detection range 32S and the third detection range 33S do not overlap.

The fourth detection range 41S, the fifth detection range 42S, and the sixth detection range 43S are set to be substantially non-overlapping. Note, however, that the fourth detection range 41S and the fifth detection range 42S may at least partially overlap. The fourth detection range 41S and the sixth detection range 43S may also at least partially overlap. The fifth detection range 42S and the sixth detection range 43S do not overlap.

Figure 3:
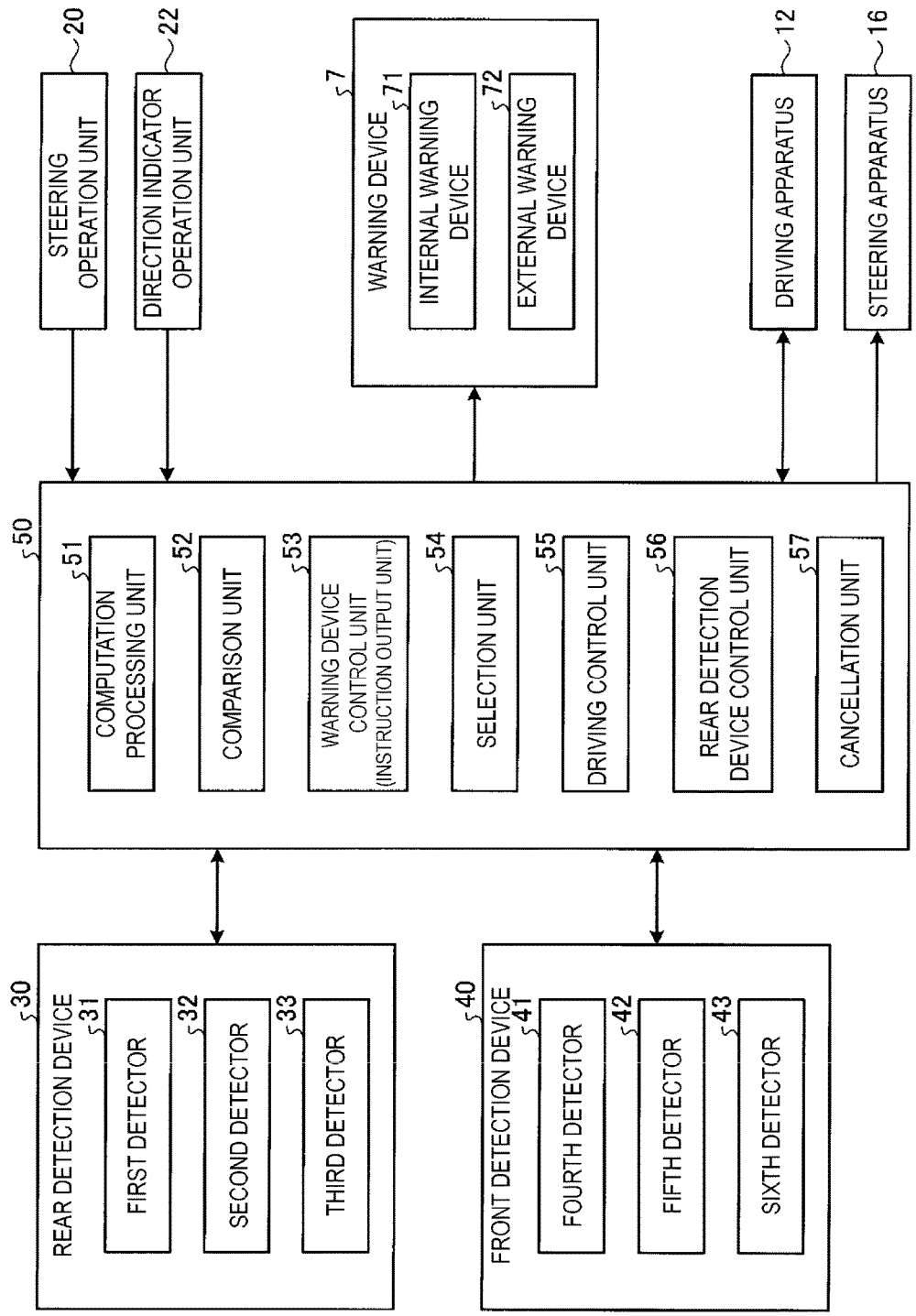
FIG. 3 is a function block diagram illustrating an example of a control device according to the first embodiment.
Figure 4:
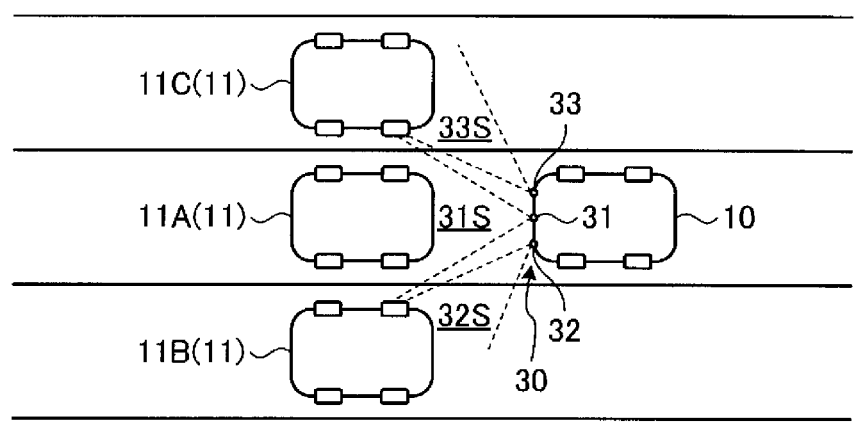
FIG. 4 is a diagram schematically illustrating a relationship between a host vehicle and following vehicles according to the first embodiment.

FIG. 3 is a function block diagram illustrating an example of the control device 50 according to the present embodiment. FIG. 4 is a diagram schematically illustrating relationships between the host vehicle 10 and the following vehicles 11. As illustrated in FIG. 4, the following vehicles 11 include a first following vehicle 11A present directly behind the host vehicle 10, a second following vehicle 11B present to the rear-right of the host vehicle 10, and a third following vehicle 11C present to the rear-left of the host vehicle 10.

As illustrated in FIG. 3, the control device 50 is connected to the rear detection device 30, the front detection device 40, the steering operation unit 20, the direction indicator operation unit 22, the warning device 7, the driving apparatus 12, and the steering apparatus 16.

A detection result from the rear detection device 30 including the first detector 31, the second detector 32, and the third detector 33 is outputted to the control device 50. A detection result from the front detection device 40 including the fourth detector 41, the fifth detector 42, and the sixth detector 43 is outputted to the control device 50.

Upon the steering operation unit 20 being operated, an operation signal is generated on the basis of an operation amount of the steering operation unit 20. The operation signal generated by the steering operation unit 20 has a high value in the case where the operation amount of the steering operation unit 20 is high. The operation signal generated by the steering operation unit 20 has a low value in the case where the operation amount of the steering operation unit 20 is low. The operation signal generated by the steering operation unit 20 is outputted to the control device 50.

Upon the direction indicator operation unit 22 being operated, an operation signal is generated. In the case where the direction indicator operation unit 22 is operated such that the direction indicators 18 arranged in the right part of the vehicle body 14 are activated, a right-side operation signal is generated by the direction indicator operation unit 22. In the case where the direction indicator operation unit 22 is operated such that the direction indicators 18 arranged in the left part of the vehicle body 14 are activated, a left-side operation signal is generated by the direction indicator operation unit 22. The operation signal generated by the direction indicator operation unit 22 is outputted to the control device 50.

The control device 50 outputs a control signal for controlling the warning device 7 including the internal warning device 71 and the external warning device 72.

The control device 50 includes a computation processing unit 51, a comparison unit 52, a warning device control unit 53, a selection unit 54, a driving control unit 55, a rear detection device control unit 56, and a cancellation unit 57. The computation processing unit 51 outputs the presence/absence of the possibility of a collision between the host vehicle 10 and the following vehicles 11. The comparison unit 52 compares risk levels of collisions with the following vehicles 11. The warning device control unit 53 controls the warning device 7. The selection unit 54 selects a space in front of the host vehicle 10 where no object is present on the basis of the detection result from the front detection device 40. The driving control unit 55 controls the driving apparatus 12. The rear detection device control unit 56 controls the rear detection device 30. The cancellation unit 57 cancels the operation signal.

On the basis of the detection result from the rear detection device 30, the computation processing unit 51 outputs (calculates) the presence/absence of the possibility of a collision between the host vehicle 10 and the first following vehicle 11A approaching the host vehicle 10 from directly behind the host vehicle 10, the presence/absence of the possibility of a collision between the host vehicle 10 and the second following vehicle 11B approaching the host vehicle 10 from the rear-right of the host vehicle 10, and the presence/absence of the possibility of a collision between the host vehicle 10 and the third following vehicle 11C approaching the host vehicle 10 from the rear-left of the host vehicle 10.

The computation processing unit 51 determines the presence/absence of the possibility of a collision between the host vehicle 10 and the first following vehicle 11A approaching the host vehicle 10 from directly behind the host vehicle 10 on the basis of a detection result from the first detector 31. In the present embodiment, the first detector 31 includes a radar device and is capable of detecting whether or not the first following vehicle 11A is present in the first detection range 31S. The first detector 31 is also capable of detecting the relative position (the relative distance and orientation) and the relative velocity of the first following vehicle 11A arranged in the first detection range 31S. The computation processing unit 51 is capable of finding the orientation of the first following vehicle 11A approaching the host vehicle 10 on the basis of the detection result from the first detector 31.

The computation processing unit 51 determines the presence/absence of the possibility of a collision between the first following vehicle 11A and the host vehicle 10 on the basis of the relative position and the relative velocity between the first following vehicle 11A and the host vehicle 10 detected using the first detector 31. For example, the computation processing unit 51 determines that there is a low possibility (there is no possibility) of a collision between the first following vehicle 11A and the host vehicle 10 in the case where, the computation processing unit 51 determines, on the basis of the relative position and the relative velocity between the first following vehicle 11A and the host vehicle 10, that the relative distance between the first following vehicle 11A and the host vehicle 10 has increased and, as a result, the first following vehicle 11A and the host vehicle 10 will not collide even if an amount of time elapsed from the point in time when the first following vehicle 11A was detected exceeds a first threshold value. The computation processing unit 51 determines that there is a high possibility (there is a possibility) of a collision between the first following vehicle 11A and the host vehicle 10 in the case where the computation processing unit 51 determines, on the basis of the relative position and the relative velocity between the first following vehicle 11A and the host vehicle 10, that the relative distance between the first following vehicle 11A and the host vehicle 10 has decreased and, as a result, the first following vehicle 11A and the host vehicle 10 will collide before the amount of time elapsed, from the point in time when the first following vehicle 11A was detected, exceeds a second threshold value. The second threshold value is a lower value than the first threshold value.

The computation processing unit 51 determines the presence/absence of the possibility of a collision between the host vehicle 10 and the second following vehicle 11B approaching the host vehicle 10 from directly to the right of the host vehicle 10 on the basis of a detection result from the second detector 32. The second detector 32 is also capable of detecting whether or not the second following vehicle 11B is present in the second detection range 32S, and the relative position (the relative distance and orientation) and the relative velocity of the second following vehicle 11B arranged in the second detection range 32S. The computation processing unit 51 is capable of finding the orientation of the second following vehicle 11B approaching the host vehicle 10 on the basis of the detection result from the second detector 32.

The computation processing unit 51 determines the presence/absence of the possibility of a collision between the second following vehicle 11B and the host vehicle 10 on the basis of the relative position and the relative velocity between the second following vehicle 11B and the host vehicle 10 detected using the second detector 32. For example, the computation processing unit 51 determines that there is a low possibility (there is no possibility) of a collision between the second following vehicle 11B and the host vehicle 10 in the case where the computation processing unit 51 determines, on the basis of the relative position and the relative velocity between the second following vehicle 11B and the host vehicle 10, that the relative distance between the second following vehicle 11B and the host vehicle 10 has increased and, as a result, the second following vehicle 11B and the host vehicle 10 will not collide even if an amount of time elapsed from the point in time when the second following vehicle 11B was detected exceeds a third threshold value. The computation processing unit 51 determines that there is a high possibility (there is a possibility)

of a collision between the second following vehicle 11B and the host vehicle 10 in the case where the computation processing unit 51 determines, on the basis of the relative position and the relative velocity between the second following vehicle 11B and the host vehicle 10, that the relative distance between the second following vehicle 11B and the host vehicle 10 has decreased and, as a result, the second following vehicle 11B and the host vehicle 10 will collide before the amount of time elapsed, from the point in time when the second following vehicle 11B was detected, exceeds a fourth threshold value. The fourth threshold value is a lower value than the third threshold value.

The computation processing unit 51 determines the presence/absence of the possibility of a collision between the host vehicle 10 and the third following vehicle 11C approaching the host vehicle 10 from directly to the left of the host vehicle 10 on the basis of a detection result from the third detector 33. The third detector 33 is also capable of detecting whether or not the third following vehicle 11C is present in the third detection range 33S, and the relative position (the relative distance and orientation) and the relative velocity of the third following vehicle 11C arranged in the third detection range 33S. The computation processing unit 51 is capable of finding the orientation of the third following vehicle 11C approaching the host vehicle 10 on the basis of the detection result from the third detector 33.

The computation processing unit 51 determines the presence/absence of the possibility of a collision between the third following vehicle 11C and the host vehicle 10 on the basis of the relative position and the relative velocity between the third following vehicle 11C and the host vehicle 10 detected using the third detector 33. For example, the computation processing unit 51 determines that there is a low possibility (there is no possibility) of a collision between the third following vehicle 11C and the host vehicle 10 in the case where the computation processing unit 51 determines, on the basis of the relative position and the relative velocity between the third following vehicle 11C and the host vehicle 10, that the relative distance between the third following vehicle 11C and the host vehicle 10 has increased and, as a result, the third following vehicle 11C and the host vehicle 10 will not collide even if an amount of time elapsed, from the point in time when the third following vehicle 11C was detected, exceeds a fifth threshold value. The computation processing unit 51 determines that there is a high possibility (there is a possibility) of a collision between the third following vehicle 11C and the host vehicle 10 in the case where the computation processing unit 51 determines, on the basis of the relative position and the relative velocity between the third following vehicle 11C and the host vehicle 10, that the relative distance between the third following vehicle 11C and the host vehicle 10 has decreased and, as a result, the third following vehicle 11C and the host vehicle 10 will collide before the amount of time elapsed, from the point in time when the third following vehicle 11C was detected, exceeds a sixth threshold value.

The computation processing unit 51 estimates an amount of time from the point in time when the first detector 31 of the rear detection device 30 detects the first following vehicle 11A to when the first following vehicle 11A and the host vehicle 10 will collide on the basis of the detection result from the first detector 31. The computation processing unit 51 estimates an amount of time from the point in time when the second detector 32 of the rear detection device 30 detects the second following vehicle 11B to when the second following vehicle 11B and the host vehicle 10 will collide on the basis of the detection result from the second detector 32.

The computation processing unit 51 estimates an amount of time from the point in time when the third detector 33 of the rear detection device 30 detects the third following vehicle 11C to when the third following vehicle 11C and the host vehicle 10 will collide on the basis of the detection result from the third detector 33.

As the estimated amount of time from the point in time when the rear detection device 30 detects the following vehicle 11 to when that following vehicle 11 and the host vehicle 10 will collide decreases, the risk level of a collision between the host vehicle 10 and the following vehicle 11 increases. Conversely, as the estimated amount of time from the point in time when the rear detection device 30 detects the following vehicle 11 to when that following vehicle 11 and the host vehicle 10 will collide increases, the risk level of a collision between the host vehicle 10 and the following vehicle 11 decreases.

The computation processing unit 51 outputs a first risk level of a collision between the host vehicle 10 and the first following vehicle 11A, a second risk level of a collision between the host vehicle 10 and the second following vehicle 11B, and a third risk level of a collision between the third following vehicle 11C and the host vehicle 10, on the basis of the estimated amount of time from the point in time when the first detector 31 detects the first following vehicle 11A to when the first following vehicle 11A and the host vehicle 10 will collide, the estimated amount of time from the point in time when the second detector 32 detects the second following vehicle 11B to when the second following vehicle 11B and the host vehicle 10 will collide, and the estimated amount of time from the point in time when the third detector 33 detects the third following vehicle 11C to when the third following vehicle 11C and the host vehicle 10 will collide.

The comparison unit 52 compares the first risk level, the second risk level, and the third risk level outputted from the computation processing unit 51. The comparison unit 52 specifies, of the first following vehicle 11A, the second following vehicle 11B, and the third following vehicle 11C, which following vehicle 11 has the highest possibility of a collision with the host vehicle 10 and the shortest estimated amount of time until the collision with the host vehicle 10 (that is, which risk level is highest).

The warning device control unit 53 controls the warning device 7 on the basis of the output result from the computation processing unit 51 such that the first warning is generated when there is a possibility of a collision with the first following vehicle 11A, the second warning is generated when there is a possibility of a collision with the second following vehicle 11B, and the third warning is generated when there is a possibility of a collision with the third following vehicle 11C. The first warning, the second warning, and the third warning have different formats. The warning device 7 generates the first warning when there is a possibility of a collision between the host vehicle 10 and the first following vehicle 11A. The warning device 7 generates the second warning when there is a possibility of a collision between the host vehicle 10 and the second following vehicle 11B. The warning device 7 generates the third warning when there is a possibility of a collision between the host vehicle 10 and the third following vehicle 11C.

In the present embodiment, the warning device control unit 53 controls the warning device 7 on the basis of the comparison result from the comparison unit 52 such that the first warning is generated when the first risk level is highest, the second warning is generated when the second risk level is highest, and the third warning is generated when the third risk level is highest. The warning device 7 generates the first warning when the possibility (the risk level) of a collision between the host vehicle 10 and the first following vehicle 11A is highest. The warning device 7 generates the second warning when the possibility (the risk level) of a collision between the host vehicle 10 and the second following vehicle 11B is highest. The warning device 7 generates the third warning when the possibility (the risk level) of a collision between the host vehicle 10 and the third following vehicle 11C is highest.

The selection unit 54 selects, from a space directly in front of the host vehicle 10, a space to the front-right of the host vehicle 10, and a space to the front-left of the host vehicle 10, a space in which no object is present, on the basis of the detection results from the rear detection device 30 and the front detection device 40. For example, in the case where the detection result from the front detection device 40 indicates that a leading vehicle is present straight in front of the host vehicle 10 and another leading vehicle is present to the front-right of the host vehicle 10 but no leading vehicle is present to the front-left of the host vehicle 10, the space to the front-left of the host vehicle 10 is a space in which no object is present. In this case, the selection unit 54 selects the space to the front-left of the host vehicle 10 from the space directly in front of the host vehicle 10, the space to the front-right of the host vehicle 10, and the space to the front-left of the host vehicle 10.

The driving control unit 55 controls the driving apparatus 12 so as to guide the host vehicle 10 into the space selected by the selection unit 54 (into the space to the front-left of the host vehicle 10, for example). The driving control unit 55 functions as a guidance unit that guides the host vehicle 10 into the space selected by the selection unit 54. In the present embodiment, the driving control unit 55 controls the steering apparatus 16 of the driving apparatus 12 such that the host vehicle 10 advances into the space selected by the selection unit 54. The driving apparatus 12 has an actuator that drives the steering apparatus 16. The driving control unit 55 guides the host vehicle 10 into the space selected by the selection unit 54 by controlling the actuator so as to control the steering apparatus 16. The control of the driving apparatus 12 (the steering apparatus 16) by the actuator takes priority over the operation of the steering operation unit 20 by the driver. For example, even if the steering operation unit 20 is operated to cause the host vehicle 10 to travel in the straight traveling state, the driving control unit 55 controls the driving apparatus 12 such that the host vehicle 10 moves into the space selected by the selection unit 54. Note that in the case where the steering operation unit 20 is being operated to cause the host vehicle 10 to move into the space selected by the selection unit 54, the driving control unit 55 may control the driving apparatus 12 (the actuator) to assist the movement of the host vehicle 10 into the space selected by the selection unit 54.

Note that the warning device control unit 53 may function as a guidance unit that guides the host vehicle 10 into the space selected by the selection unit 54. The warning device control unit 53 may control the internal warning device 71 arranged within the host vehicle 10 and use the internal warning device 71 to instruct the driver of a target advancement direction for the host vehicle 10 such that the host vehicle 10 moves into the space selected by the selection unit 54. The warning device control unit 53 causes the internal warning device 71 to function as an instruction output unit that is arranged within the host vehicle 10 and instructs the driver of the target advancement direction of the host vehicle 10. The host vehicle 10 moves into the space selected by the selection unit 54 as a result of the driver operating the steering operation unit 20 such that the host vehicle 10 moves in the target advancement direction instructed by the internal warning device 71.

The rear detection device control unit 56 controls the rear detection device 30. In the present embodiment, the rear detection device control unit 56 is capable of switching each of the first detector 31, the second detector 32, and the third detector 33 from an active state to an inactive state and vice versa. The active state of the first detector 31 includes a state in which an object can be detected by the first detector 31, and includes a state in which radio waves (or ultrasonic waves) are emitted from the emitter of the first detector 31. The inactive state of the first detector 31 includes a state in which an object cannot be detected by the first detector 31, and includes a state in which radio waves (or ultrasonic waves) are not emitted from the emitter of the first detector 31. The active state of the second detector 32 and the active state of the third detector 33 are the same as the active state of the first detector 31. The inactive state of the second detector 32 and the inactive state of the third detector 33 are the same as the inactive state of the first detector 31. The rear detection device control unit 56 is capable of switching the first detector 31 from the active state to the inactive state and vice versa. The rear detection device control unit 56 is capable of switching the second detector 32 from the active state to the inactive state and vice versa. The rear detection device control unit 56 is capable of switching the third detector 33 from the active state to the inactive state and vice versa.

The cancellation unit 57 cancels the operation signal outputted from the direction indicator operation unit 22. In the present embodiment, the cancellation unit 57 cancels the operation signal outputted from the direction indicator operation unit 22 by outputting a cancellation signal. For example, when the host vehicle 10 changes lanes to the lane to the immediate left thereof (or when the host vehicle 10 turns left), the driver operates the direction indicator operation unit 22 such that the left direction indicators 18 are activated. Thereafter, the steering operation unit 20 is operated such that the host vehicle 10 changes from a straight traveling state to a non-straight traveling state to the left. As a result, the advancement direction of the host vehicle 10 changes to the left. After the host vehicle 10 has finished changing lanes to the lane to the immediate left thereof (or after the host vehicle 10 has finished turning left), the steering operation unit 20 is operated such that the host vehicle 10 changes from the non-straight traveling state to the left to the straight traveling state. When the host vehicle 10 has changed from the non-straight traveling state to the straight traveling state (when the steering operation unit 20 has been returned to a neutral position), the operation signal that had been outputted from the direction indicator operation unit 22 is canceled by the cancellation signal outputted from the cancellation unit 57. As a result, the direction indicators 18 are deactivated and the direction indicator operation unit 22 returns to the neutral position. The same applies when the host vehicle 10 changes lanes to the lane to the immediate right thereof (or when the host vehicle 10 turns right).

Figure 5:
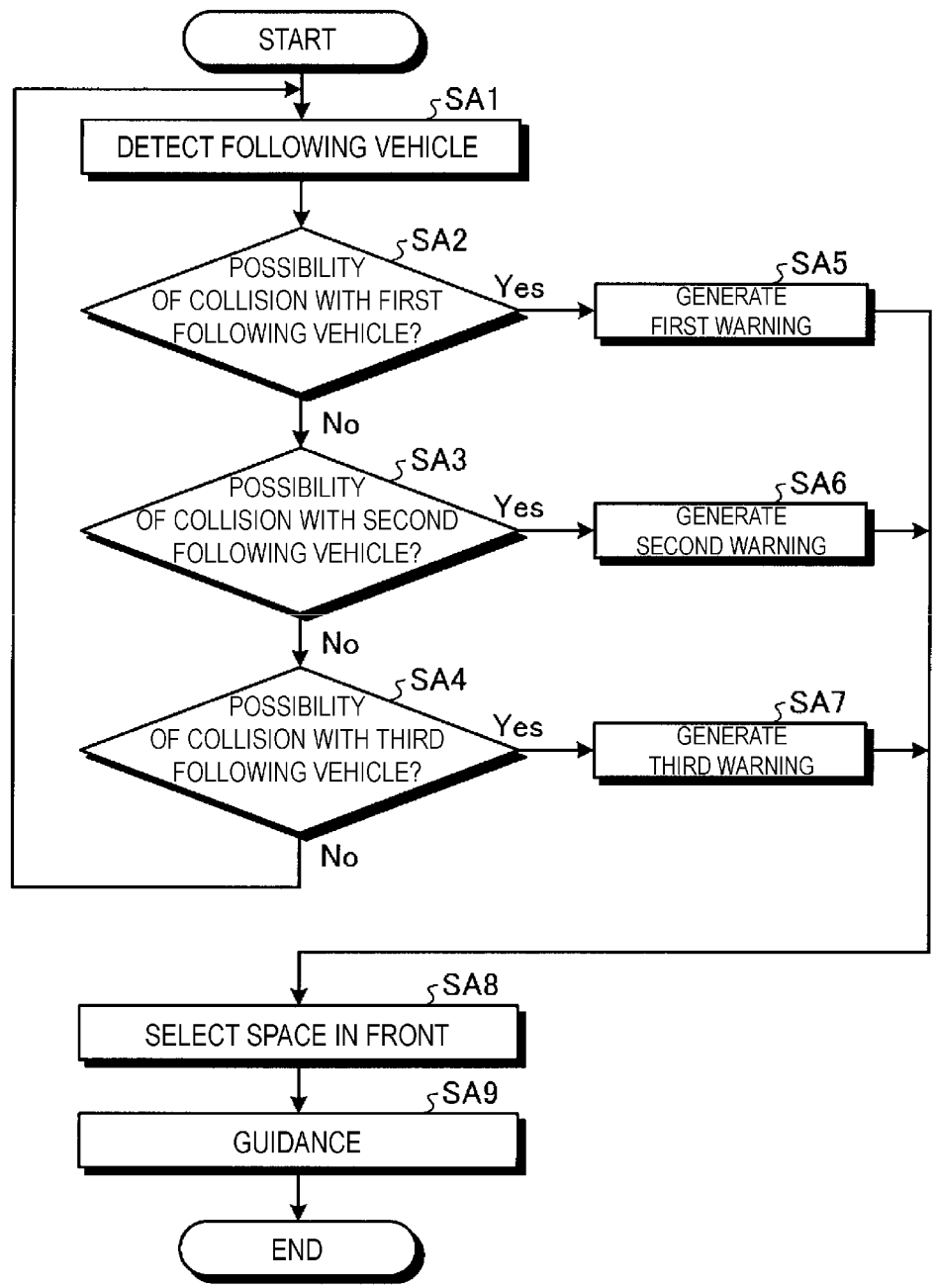
FIG. 5 is a flowchart illustrating an example of a collision avoidance method according to the first embodiment.

Next, an example of a collision avoidance method according to the present embodiment will be described with reference to FIG. 5. FIG. 5 is a flowchart illustrating an example of the collision avoidance method according to the present embodiment.

The host vehicle 10 travels forward. The rear detection device 30 arranged in the host vehicle 10 detects the first following vehicle 11A directly behind the host vehicle 10, the second following vehicle 11B to the rear-right of the host vehicle 10, and the third following vehicle 11C to the rear-left of the host vehicle 10 in a non-contact manner (step SA1).

On the basis of the detection result from the rear detection device 30, the computation processing unit 51 determines the presence/absence of the possibility of a collision between the host vehicle 10 and the first following vehicle 11A approaching the host vehicle 10 from directly behind, the presence/absence of the possibility of a collision between the host vehicle 10 and the second following vehicle 11B approaching the host vehicle 10 from the rear-right, and the presence/absence of the possibility of a collision between the host vehicle 10 and the third following vehicle 11C approaching the host vehicle 10 from the rear-left.

The presence/absence of the possibility of a collision between the first following vehicle 11A and the host vehicle 10 is determined (step SA2).

In the case where it is determined that there is no possibility of a collision between the first following vehicle 11A and the host vehicle 10 (NO in step SA2), the presence/absence of the possibility of a collision between the second following vehicle 11B and the host vehicle 10 is determined (step SA3).

In the case where it is determined that there is no possibility of a collision between the second following vehicle 11B and the host vehicle 10 (NO in step SA3), the presence/absence of the possibility of a collision between the third following vehicle 11C and the host vehicle 10 is determined (step SA4).

In the case where it is determined that there is no possibility of a collision between the third following vehicle 11C and the host vehicle 10 (NO in step SA4), the process returns to step SA1 and the detection by the rear detection device 30 is continued.

In the case where it is determined that there is the possibility of a collision between the first following vehicle 11A and the host vehicle 10 (YES in step SA2), the warning device control unit 53 generates the first warning using the warning device 7 arranged in the host vehicle 10 (step SA5).

Figure 6:
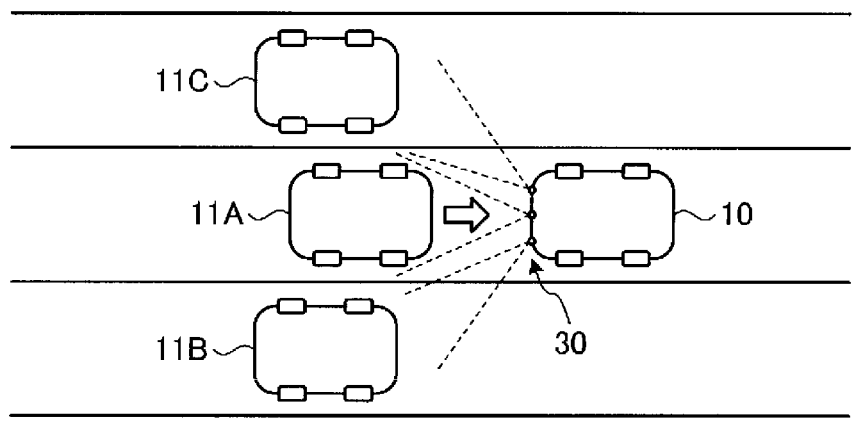
FIG. 6 is a schematic diagram illustrating a state in which it is highly likely that a host vehicle and a first following vehicle will collide.

FIG. 6 is a schematic diagram illustrating an example of a state in which the relative distance between the first following vehicle 11A and the host vehicle 10 has decreased and the possibility (the risk level) of a collision between the first following vehicle 11A and the host vehicle 10 has increased. In the state illustrated in FIG. 6, the warning device 7 generates the first warning.

Figure 7:
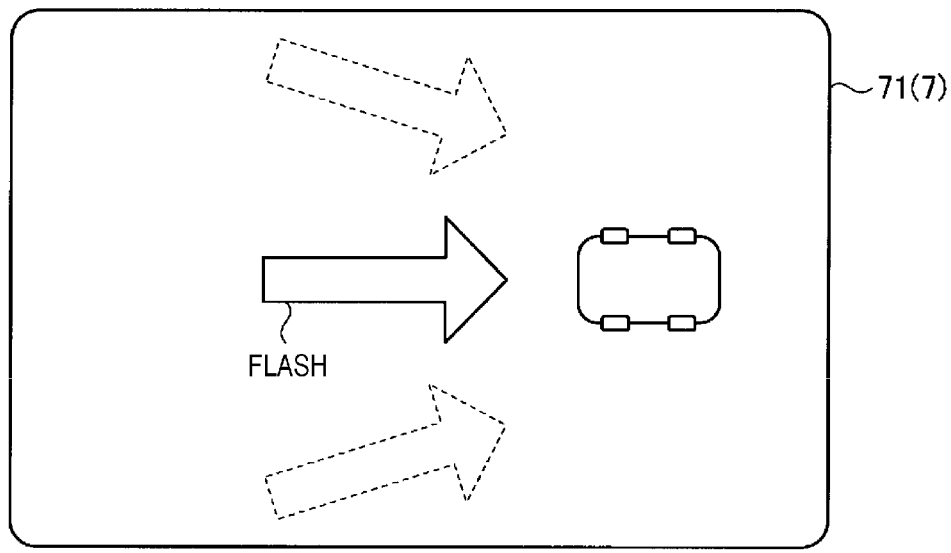
FIG. 7 is a diagram illustrating an example of a state in which an internal warning device generates a first warning according to the first embodiment.

FIG. 7 is a schematic diagram illustrating an example of a state in which the internal warning device 71 generates the first warning. The warning generated by the internal warning device 71 includes sound, an image, or both. As illustrated in FIG. 7, the internal warning device 71 includes a display unit that displays an image and a sound emitter that generates a sound. In the example illustrated in FIG. 7, the driver of the host vehicle 10 is warned of the first following vehicle 11A directly behind the host vehicle 10 approaching the host vehicle 10, and the possibility (the risk level) of a collision between the first following vehicle 11A and the host vehicle 10 having increased, using image data including an arrow. A voice saying "danger directly behind" is also outputted.

Figure 8:
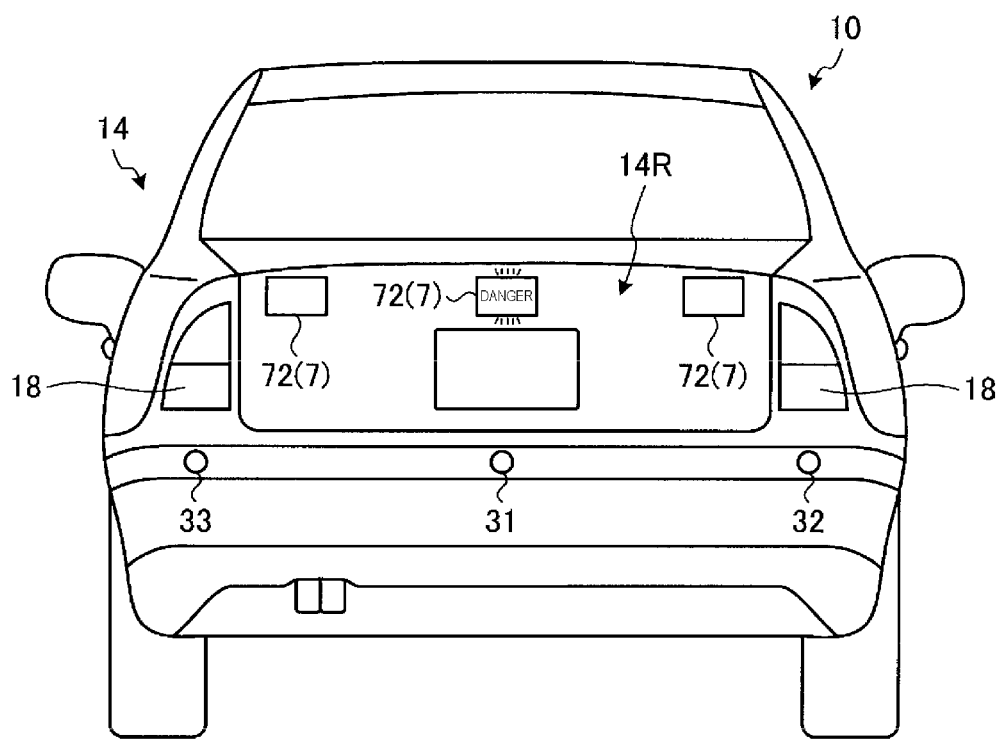
FIG. 8 is a diagram illustrating an example of a state in which an external warning device generates a first warning according to the first embodiment.

FIG. 8 is a schematic diagram illustrating an example of a state in which the external warning device 72 generates the first warning. The warning generated by the external warning device 72 includes sound, an image, or both. As illustrated in FIG. 8, the external warning device 72 includes a display unit that displays an image and a sound emitter that generates a sound. In the example illustrated in FIG. 8, the driver of the first following vehicle 11A is warned of the first following vehicle 11A directly behind the host vehicle 10 approaching the host vehicle 10, and the possibility (the risk level) of a collision between the first following vehicle 11A and the host vehicle 10 having increased, using an image. The display unit of the external warning device 72 that generates the first warning is arranged in the central part of the rear part 14R of the vehicle body 14 of the host vehicle 10 so as to be easily visible to the driver of the first following vehicle 11A. The external warning device 72 may also generate a warning for the driver of the first following vehicle 11A by outputting a voice saying "danger directly behind".

In the case where it is determined that there is the possibility of a collision between the second following vehicle 11B and the host vehicle 10 (YES in step SA3), the warning device control unit 53 generates the second warning using the warning device 7 arranged in the host vehicle 10 (step SA6).

Figure 9:
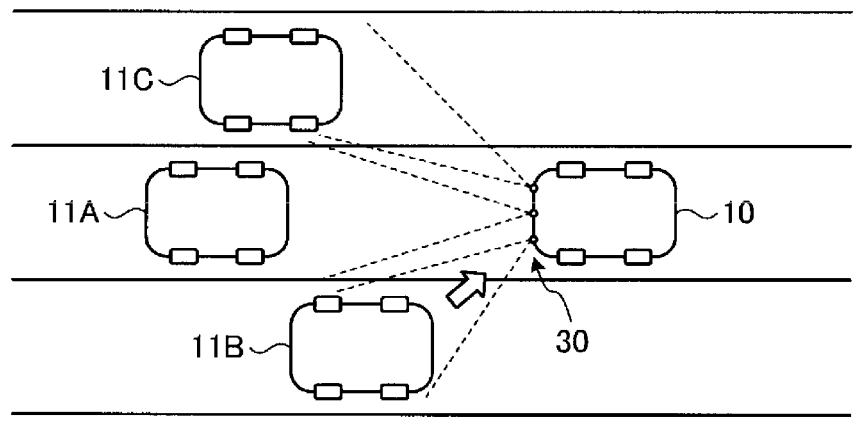
FIG. 9 is a schematic diagram illustrating a state in which it is highly likely that a host vehicle and a second following vehicle will collide.

FIG. 9 is a schematic diagram illustrating an example of a state in which the relative distance between the second following vehicle 11B and the host vehicle 10 has decreased and the possibility (the risk level) of a collision between the second following vehicle 11B and the host vehicle 10 has increased. In the state illustrated in FIG. 9, the warning device 7 generates the second warning.

Figure 10:
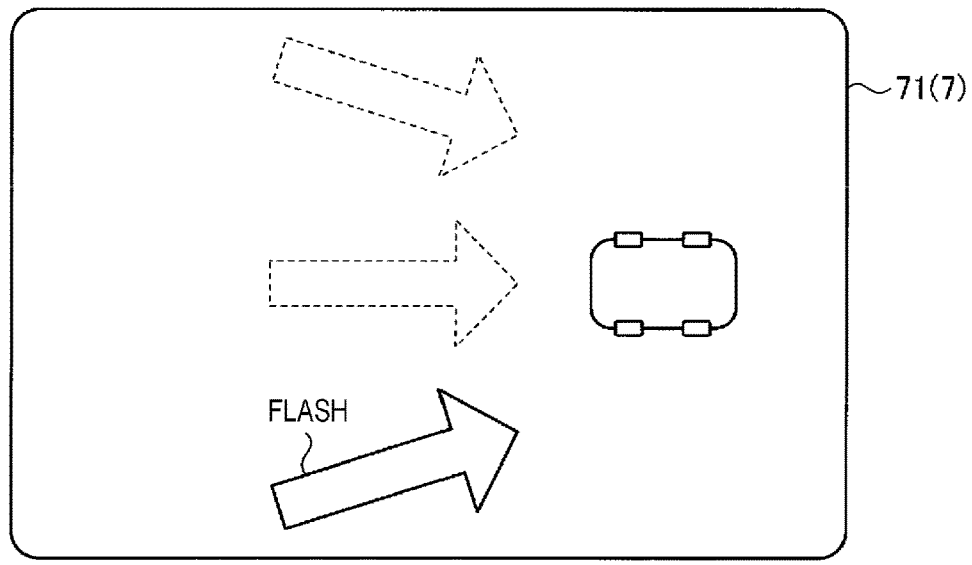
FIG. 10 is a diagram illustrating an example of a state in which the internal warning device generates a second warning according to the first embodiment.

FIG. 10 is a schematic diagram illustrating an example of a state in which the internal warning device 71 generates the second warning. The warning generated by the internal warning device 71 includes sound, an image, or both. As illustrated in FIG. 10, the internal warning device 71 includes a display unit that displays an image and a sound emitter that generates a sound. In the example illustrated in FIG. 10, the driver of the host vehicle 10 is warned of the second following vehicle 11B to the rear-right of the host vehicle 10 approaching the host vehicle 10, and the possibility (the risk level) of a collision between the second following vehicle 11B and the host vehicle 10 having increased, using image data including an arrow. A voice saying "danger to the rear-right" is also outputted.

Figure 11:
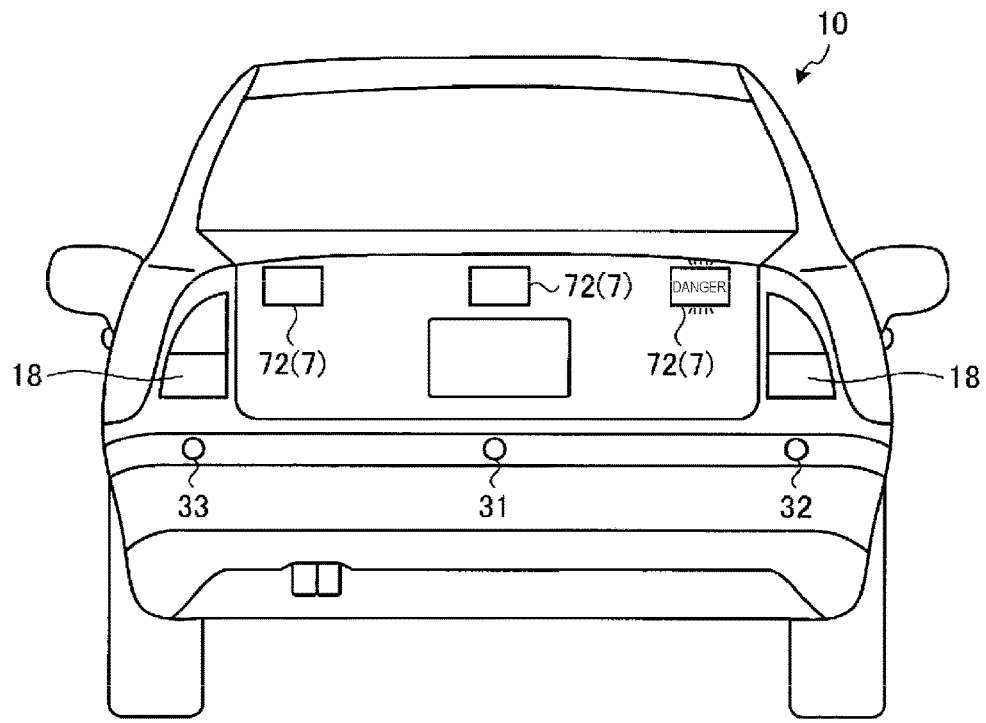
FIG. 11 is a diagram illustrating an example of a state in which the external warning device generates a second warning according to the first embodiment.

FIG. 11 is a schematic diagram illustrating an example of a state in which the external warning device 72 generates the second warning. The warning generated by the external warning device 72 includes sound, an image, or both. As illustrated in FIG. 11, the external warning device 72 includes a display unit that displays an image and a sound emitter that generates a sound. In the example illustrated in FIG. 11, the driver of the second following vehicle 11B is warned of the second following vehicle 11B to the rear-right of the host vehicle 10 approaching the host vehicle 10, and the possibility (the risk level) of a collision between the second following vehicle 11B and the host vehicle 10 having increased, using an image. The display unit of the external warning device 72 that generates the second warning is arranged in the right part of the rear part 14R of the vehicle body 14 of the host vehicle 10 so as to be easily visible to the driver of the second following vehicle 11B. The external warning device 72 may also generate a warning for the driver of the second following vehicle 11B by outputting a voice saying "danger to the rear-right".

In the case where it is determined that there is the possibility of a collision between the third following vehicle 11C and the host vehicle 10 (YES in step SA4), the warning device control unit 53 generates the third warning using the warning device 7 arranged in the host vehicle 10 (step SA7).

Figure 12:
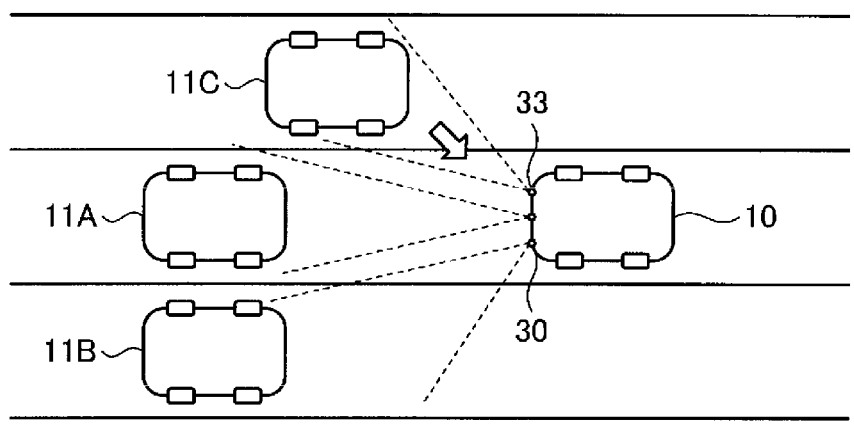
FIG. 12 is a schematic diagram illustrating a state in which it is highly likely that a host vehicle and a third following vehicle will collide.

FIG. 12 is a schematic diagram illustrating an example of a state in which the relative distance between the third following vehicle 11C and the host vehicle 10 has decreased and the possibility (the risk level) of a collision between the third following vehicle 11C and the host vehicle 10 has increased. In the state illustrated in FIG. 12, the warning device 7 generates the third warning.

Figure 13:
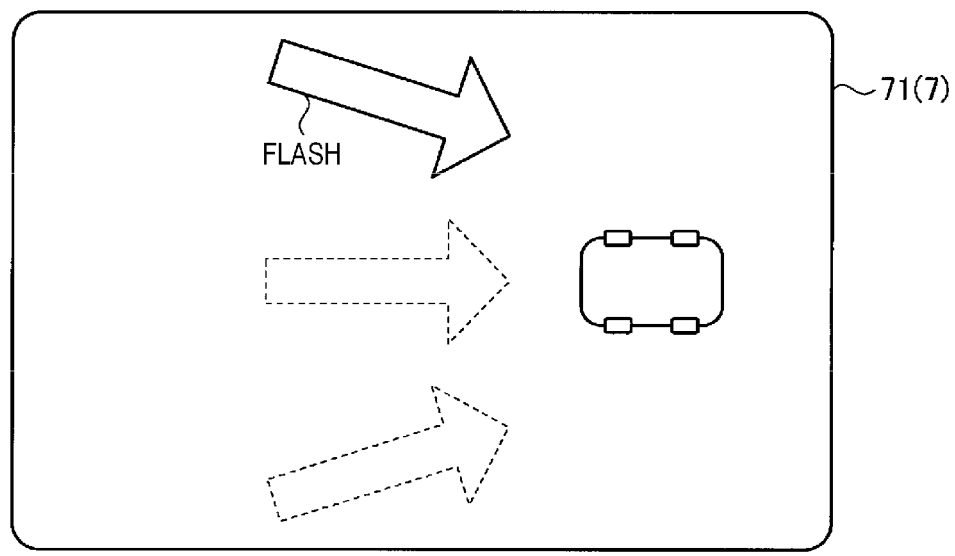
FIG. 13 is a diagram illustrating an example of a state in which the internal warning device generates a third warning according to the first embodiment.

FIG. 13 is a schematic diagram illustrating an example of a state in which the internal warning device 71 generates the third warning. The warning generated by the internal warning device 71 includes sound, an image, or both. As illustrated in FIG. 13, the internal warning device 71 includes a display unit that displays an image and a sound emitter that generates a sound. In the example illustrated in FIG. 13, the driver of the host vehicle 10 is warned of the third following vehicle 11C to the rear-left of the host vehicle 10 approaching the host vehicle 10, and the possibility (the risk level) of a collision between the third following vehicle 11C and the host vehicle 10 having increased, using image data including an arrow. A voice saying "danger to the rear-left" is also outputted.

Figure 14:
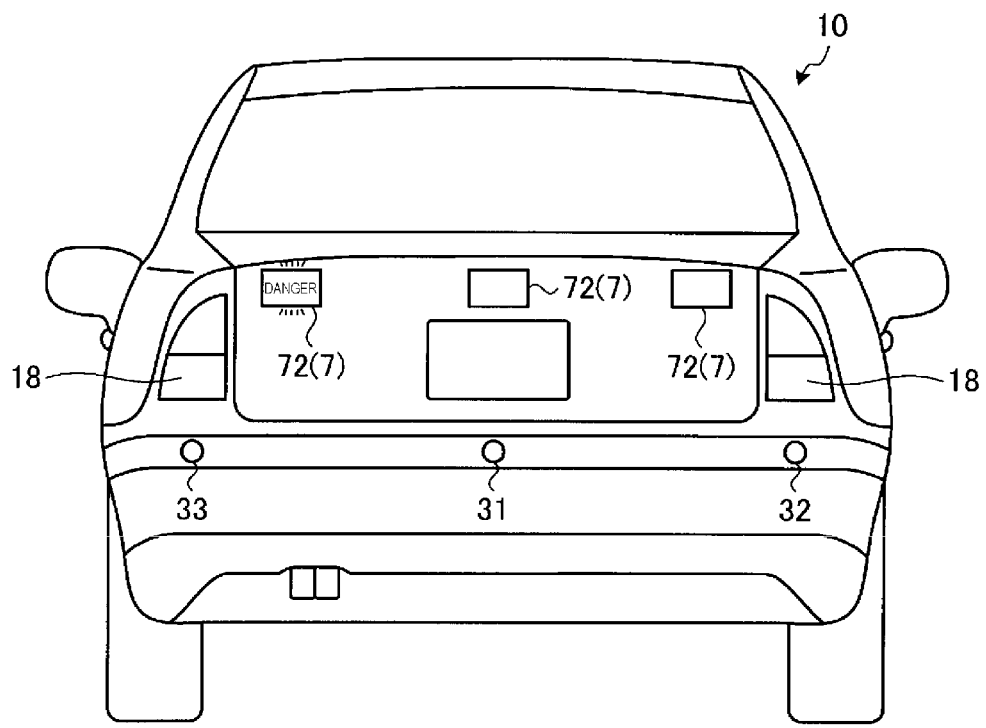
FIG. 14 is a diagram illustrating an example of a state in which the external warning device generates a third warning according to the first embodiment.

FIG. 14 is a schematic diagram illustrating an example of a state in which the external warning device 72 generates the third warning. The warning generated by the external warning device 72 includes sound, an image, or both. As illustrated in FIG. 14, the external warning device 72 includes a display unit that displays an image and a sound emitter that generates a sound. In the example illustrated in FIG. 14, the driver of the third following vehicle 11C is warned of the third following vehicle 11C to the rear-left of the host vehicle 10 approaching the host vehicle 10, and the possibility (the risk level) of a collision between the third following vehicle 11C and the host vehicle 10 having increased, using an image. The display unit of the external warning device 72 that generates the third warning is arranged in the left part of the rear part 14R of the vehicle body 14 of the host vehicle 10 so as to be easily visible to the driver of the third following vehicle 11C. The external warning device 72 may also generate a warning for the driver of the third following vehicle 11C by outputting a voice saying "danger to the rear-left".

As illustrated in FIGS. 7, 10, and 13, a screen design of the display unit of the internal warning device 71 that generates the first warning, a screen design of the display unit of the internal warning device 71 that generates the second warning, and a screen design of the display unit of the internal warning device 71 that generates the third warning are different. Additionally, the content of the voice emitted by the sound emitter of the internal warning device 71 that generates the first warning, the content of the voice emitted by the sound emitter of the internal warning device 71 that generates the second warning, and the content of the voice emitted by the sound emitter of the internal warning device 71 that generates the third warning are different.

As illustrated in FIGS. 8, 11, and 14, a position (or a screen design) of the display unit of the external warning device 72 that generates the first warning, a position (or a screen design) of the display unit of the external warning device 72 that generates the second warning, and a position (or a screen design) of the display unit of the external warning device 72 that generates the third warning are different. Additionally, the content of the voice emitted by the sound emitter of the external warning device 72 that generates the first warning, the content of the voice emitted by the sound emitter of the external warning device 72 that generates the second warning, and the content of the voice emitted by the sound emitter of the external warning device 72 that generates the third warning are different.

Note that in the present embodiment, in the case where it is determined that there is a possibility that all of the first following vehicle 11A, the second following vehicle 11B, and the third following vehicle 11C will collide with the host vehicle 10, the computation processing unit 51 estimates a first amount of time, a second amount of time, and a third amount of time. The first amount of time is an amount of time from the point in time when the rear detection device 30 detects the first following vehicle 11A to when the first following vehicle 11A and the host vehicle 10 will collide. The second amount of time is an amount of time from the point in time when the rear detection device 30 detects the second following vehicle 11B to when the second following vehicle 11B and the host vehicle 10 will collide. The third amount of time is an amount of time from the point in time when the rear detection device 30 detects the third following vehicle 11C to when the third following vehicle 11C and the host vehicle 10 will collide. The computation processing unit 51 outputs the first risk level of a collision between the host vehicle 10 and the first following vehicle 11A, the second risk level of a collision between the host vehicle 10 and the second following vehicle 11B, and the third risk level of a collision between the host vehicle 10 and the third following vehicle 11C on the basis of the estimated first amount of time, second amount of time, and third amount of time. The comparison unit 52 compares the first risk level, the second risk level, and the third risk level outputted from the computation processing unit 51 and ranks the risk levels. On the basis of the comparison result from the comparison unit 52, the warning device 7 generates the first warning as illustrated in FIGS. 7 and 8 when the first risk level is the highest, generates the second warning as illustrated in FIGS. 10 and 11 when the second risk level is the highest, and generates the third warning as illustrated in FIGS. 13 and 14 when the third risk level is the highest.

In the case where there is the possibility of a collision between a following vehicle 11 and the host vehicle 10, an object directly in front of the host vehicle 10, an object to the front-right of the host vehicle 10, and an object to the front-left of the host vehicle 10 are detected in a non-contact manner by the front detection device 40 arranged in the host vehicle 10. The selection unit 54 selects, from the space directly in front, the space to the front-right, and the space to the front-left, a space in which no object is present, on the basis of the detection result from the front detection device 40 (step SA8).

Figure 15:
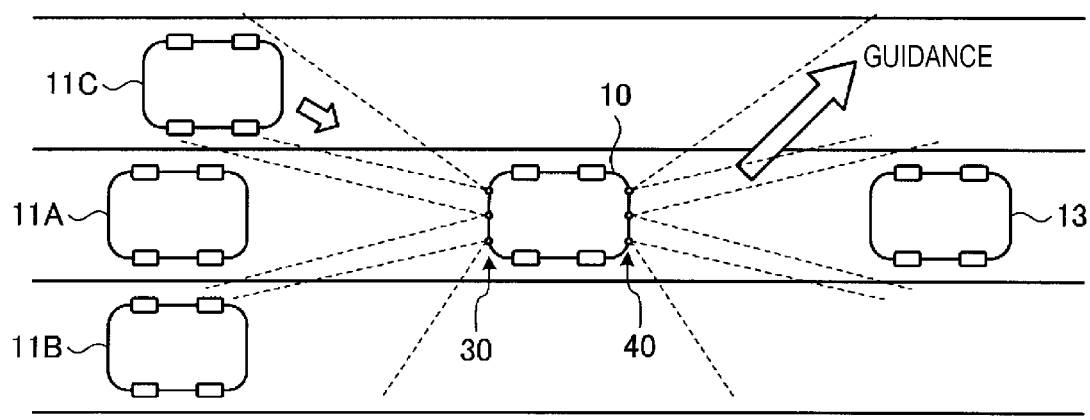
FIG. 15 is a schematic diagram illustrating a state in which a host vehicle is guided by a guidance unit.

FIG. 15 is a diagram illustrating an example of a state in which the possibility of a collision between the third following vehicle 11C and the host vehicle 10 is high, and there are no objects in the space to the front-right of the host vehicle 10 and in the space to the front-left of the host vehicle 10. In the example illustrated in FIG. 15, a leading vehicle 13 (object) is present in the space directly in front of the host vehicle 10. However, there is no leading vehicle 13 (object) in the space to the front-right and the space to the front-left of the host vehicle 10.

In the present embodiment, the host vehicle 10 is guided to a space, among the space directly in front, the space to the front-right, and the space to the front-left, in which no object is present (step SA9). As a result, the host vehicle 10 can escape from the following vehicle 11 and avoid a collision with the following vehicle 11 while also avoiding a collision with the leading vehicle 13.

In the example illustrated in FIG. 15, the host vehicle 10 is moved to the space to the front-right or the space to the front-left. In the case where the host vehicle 10 has moved to the space to the front-right, the host vehicle 10 cannot completely escape from the third following vehicle 11C, which is moving to the front-right. Accordingly, in the example illustrated in FIG. 15, the selection unit 54 selects, from the space to the front-right and the space to the front-left in which there are no objects, the space to the front-left, in which the host vehicle 10 can completely escape from the third following vehicle 11C, on the basis of the detection results from the rear detection device 30 and the front detection device 40.

The host vehicle 10 is guided to the space to the front-left, which has been selected by the selection unit 54. The guidance unit is arranged within the host vehicle 10. The guidance unit includes the internal warning device 71 and the warning device control unit 53. The internal warning device 71 instructs the driver of the target advancement direction of the host vehicle 10 such that the host vehicle 10 moves into the space to the front-left. The warning device control unit 53 controls the internal warning device 71. The host vehicle 10 can move into the space to the front-left smoothly in response to the driver operating the steering operation unit 20 on the basis of the instruction outputted from the internal warning device 71. Additionally, in the present embodiment, the guidance unit includes the driving control unit 55 that controls the driving apparatus 12 of the host vehicle 10. The driving control unit 55 may control the driving apparatus 12 (the steering apparatus 16) such that the host vehicle 10 moves into the space to the front-left, or may assist the driver's operation of the steering operation unit 20 by controlling the driving apparatus 12.

As described thus far, according to the present embodiment, the presence/absence of the possibility of a collision with the first following vehicle 11A approaching the host vehicle 10 from directly behind, the presence/absence of the possibility of a collision with the second following vehicle 11B approaching the host vehicle 10 from the rear-right, and the presence/absence of the possibility of a collision with the third following vehicle 11C approaching the host vehicle 10 from the rear-left are outputted. Accordingly, the orientation of a following vehicle 11 with which there is a possibility that the host vehicle 10 will collide is understood correctly. Additionally, according to the present embodiment, at least one of the first warning, the second warning, and the third warning, which have different formats, is generated on the basis of the output result regarding the presence/absence of the possibility of a collision. Accordingly, a warning suitable for collision avoidance is generated, and the generation of unnecessary warnings is suppressed. As such, proper measures for collision avoidance are taken on the basis of that warning.

For example, in the case where it has been determined that there is the possibility of a collision with the first following vehicle 11A, the first following vehicle 11A can be cautioned by the warning device 7 (the external warning device 72) generating the first warning for the first following vehicle 11A. As a result, a collision between the host vehicle 10 and the first following vehicle 11A can be prevented. In the case where it has been determined that there is no possibility of a collision (a low possibility of a collision) with the second following vehicle 11B and the third following vehicle 11C, the second warning is not generated for the second following vehicle 11B and the third warning is not generated for the third following vehicle 11C. The warnings are not generated for the second following vehicle 11B and the third following vehicle 11C, with which there is no possibility of a collision, and thus the generation of unnecessary warnings is suppressed. Accordingly, the drivers of the second following vehicle 11B and the third following vehicle 11C can carry out driving operations smoothly.

Meanwhile, in the case where it has been determined that there is the possibility of a collision with the first following vehicle 11A, the driver of the host vehicle 10 can be cautioned by the warning device 7 (the internal warning device 71) generating the first warning for the driver of the host vehicle 10. In the case where it has been determined that there is no possibility of a collision (a low possibility of a collision) with the second following vehicle 11B and the third following vehicle 11C, the second warning and the third warning are not generated for the driver of the host vehicle 10. The second warning and the third warning are not generated, and thus the generation of unnecessary warnings is suppressed. Accordingly, the driver of the host vehicle 10 can carry out appropriate driving operations for avoiding a collision with the first following vehicle 11A. As a result, a collision between the host vehicle 10 and the first following vehicle 11A can be prevented.

According to the present embodiment, the first amount of time from the point in time when the rear detection device 30 detects the first following vehicle 11A to when the first following vehicle 11A and the host vehicle 10 will collide, the second amount of time from the point in time when the rear detection device 30 detects the second following vehicle 11B to when the second following vehicle 11B and the host vehicle 10 will collide, and the third amount of time from the point in time when the rear detection device 30 detects the third following vehicle 11C to when the third following vehicle 11C and the host vehicle 10 will collide, are each estimated. Then, the first risk level of a collision between the host vehicle 10 and the first following vehicle 11A, the second risk level of a collision between the host vehicle 10 and the second following vehicle 11B, and the third risk level of a collision between the third following vehicle 11C and the host vehicle 10, are outputted on the basis of those estimation results. The first warning is generated when the first risk level is the highest, the second warning is generated when the second risk level is the highest, and the third risk level is generated when the third risk level is the highest. In the case where the first following vehicle 11A, the second following vehicle 11B, and the third following vehicle 11C have been detected by the rear detection device 30, the following vehicle 11 that, of the first following vehicle 11A, the second following vehicle 11B, and the third following vehicle 11C, has the highest possibility of a collision with the host vehicle 10 (that is, has the highest risk level), is selected, and a warning is generated for that following vehicle 11. Accordingly, a collision between the host vehicle 10 and the following vehicle 11 is prevented while also suppressing the generation of unnecessary warnings.

According to the present embodiment, an object directly in front of the host vehicle 10, an object to the front-right of the host vehicle 10, and an object to the front-left of the host vehicle 10 are detected by the front detection device 40 in a non-contact manner. When it has been determined that the host vehicle 10 will be collided with a following vehicle 11 approaching from a given direction on the basis of the detection result from the rear detection device 30, the host vehicle 10 is guided to a space, of the space directly in front, the space to the front-right, and the space to the front-left, in which there is no object, on the basis of the detection result from the front detection device 40. As a result, a collision between the host vehicle 10 and the following vehicle 11 can be prevented.

According to the present embodiment, the guidance unit that guides the host vehicle 10 to a space where there is no object includes at least one of the instruction output unit (warning device output unit) 53 and the driving control unit 55. The instruction output unit 53 is arranged within the host vehicle 10 and instructs the driver of the target advancement direction of the host vehicle 10. The driving control unit 55 controls the driving apparatus 12 of the host vehicle 10. As a result, the host vehicle 10 is smoothly guided to a forward space in which there is no object. Because the guidance unit includes an output unit (the display unit or the sound emitter) arranged within the vehicle, the driver can operate the steering operation unit 20 in accordance with the instruction outputted from that output unit and move the host vehicle 10 into the forward space in which there is no object. Because the guidance unit includes the driving control unit 55, the host vehicle 10 can move into the forward space in which there is no object under the control of the driving control unit 55.

According to the present embodiment, the warning generated by the warning device 7 includes sound, an image, or both. Generating the warning using sound makes it possible for the driver of the following vehicle 11 or the driver of the host vehicle 10 to understand the details of the warning auditorily. Generating the warning using an image makes it possible for the driver of the following vehicle 11 or the driver of the host vehicle 10 to understand the details of the warning visually.

Second Embodiment

A second embodiment will now be described. In the following descriptions, constituent elements identical to those in the above-described embodiment will be given the same reference signs, and descriptions thereof will be simplified or omitted.

Figure 16:
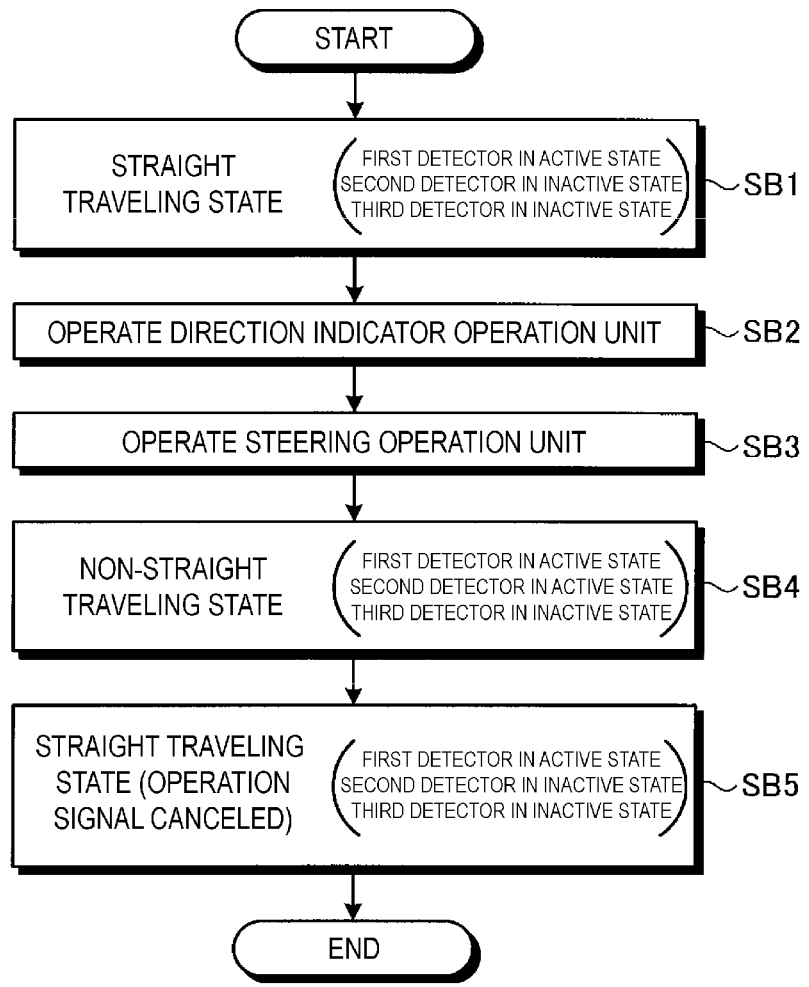
FIG. 16 is a flowchart illustrating an example of a collision avoidance method according to a second embodiment.
Figure 17:
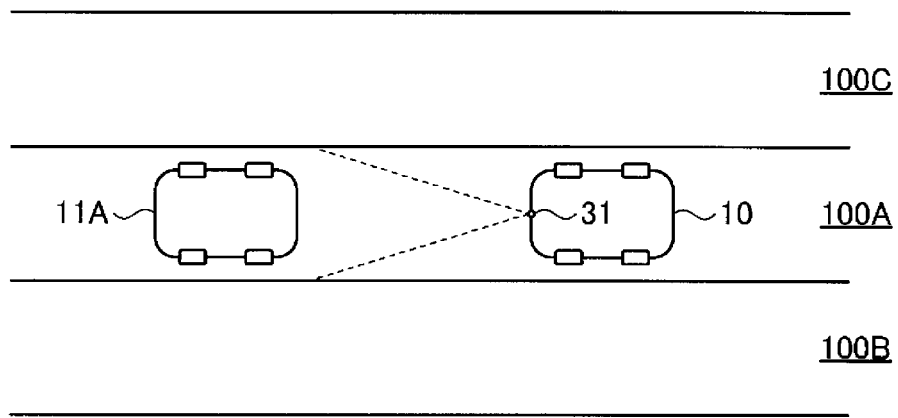
FIG. 17 is a diagram schematically illustrating an example of operations performed by a host vehicle according to the second embodiment.

FIG. 16 is a flowchart illustrating an example of the collision avoidance method according to the present embodiment. FIG. 17 is a diagram schematically illustrating an example of operations performed by the host vehicle 10. As illustrated in FIG. 16, when the host vehicle 10 is in a straight traveling state in a center lane 100A, the rear detection device control unit 56 controls the rear detection device 30 such that the first detector 31 is in an active state, the second detector 32 is in an inactive state, and the third detector 33 is in an inactive state (step SB1).

For example, in the case where the host vehicle 10 changes lanes to an immediate right lane 100B, the driver of the host vehicle 10 operates the direction indicator operation unit 22 (step SB2). In the case where the host vehicle 10 changes lanes from the lane 100A to the lane 100B, the direction indicator operation unit 22 is operated such that the direction indicators 18 on the right part of the host vehicle 10 are activated. The direction indicator operation unit 22 generates an operation signal in response to the direction indicator operation unit 22 being operated. The operation signal generated by the direction indicator operation unit 22 is outputted to the rear detection device control unit 56.

Additionally, the driver of the host vehicle 10 operates the steering operation unit 20 such that the host vehicle 10 changes lanes from the lane 100A to the lane 100B (step SB3). The steering operation unit 20 generates an operation signal in response to the steering operation unit 20 being operated. The operation signal generated by the steering operation unit 20 includes operation amount data indicating the operation amount of the steering operation unit 20. The operation signal generated by the steering operation unit 20 is outputted to the rear detection device control unit 56.

Figure 18:
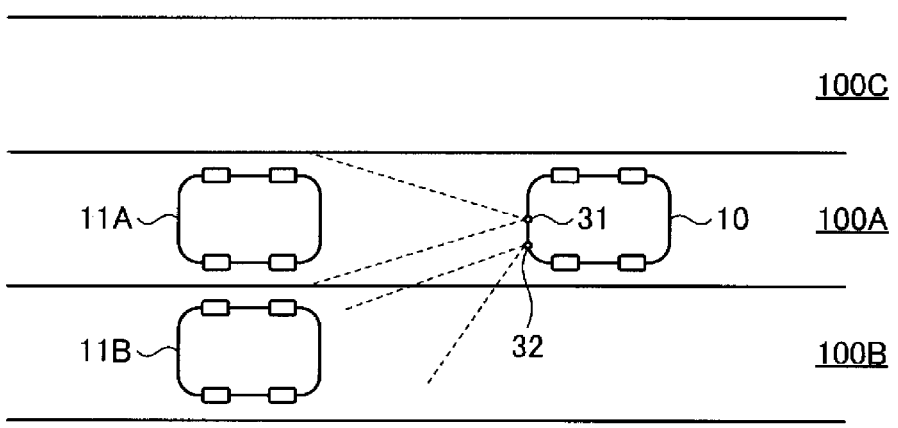
FIG. 18 is a diagram schematically illustrating an example of operations performed by the host vehicle according to the second embodiment.

FIG. 18 is a schematic diagram illustrating an example of the state of the host vehicle 10 after the direction indicator operation unit 22 has been operated. As illustrated in FIG. 18, the rear detection device control unit 56 switches the second detector 32 in an inactive state to an active state on the basis of the operation signal outputted from the direction indicator operation unit 22. As a result, when the host vehicle 10 changes lanes from the lane 100A to the lane 100B, the presence/absence of an object (the second following vehicle 11B) to the rear-right of the host vehicle 10 is detected.

For example, in the case where the second following vehicle 11B in the lane 100B has been detected by the second detector 32, the warning device 7 is activated. The second following vehicle 11B is cautioned by the external warning device 72 being activated. The driver of the host vehicle 10 is cautioned by the internal warning device 71 being activated. The driver may cancel the lane change from the lane 100A to the lane 100B, for example.

Note that when the steering operation unit 20 is operated such that the host vehicle 10 changes lanes from the lane 100A to the lane 100B, the rear detection device control unit 56 may, on the basis of the operation amount of the steering operation unit 20, determine that the host vehicle 10 in a straight traveling state has changed from the straight traveling state to a non-straight traveling state in order to change lanes, and may switch the second detector 32 in the inactive state to the active state. As a result of this too, when the host vehicle 10 changes lanes from the lane 100A to the lane 100B, the presence/absence of an object (the second following vehicle 11B) to the rear-right of the host vehicle 10 is detected.

Figure 19:
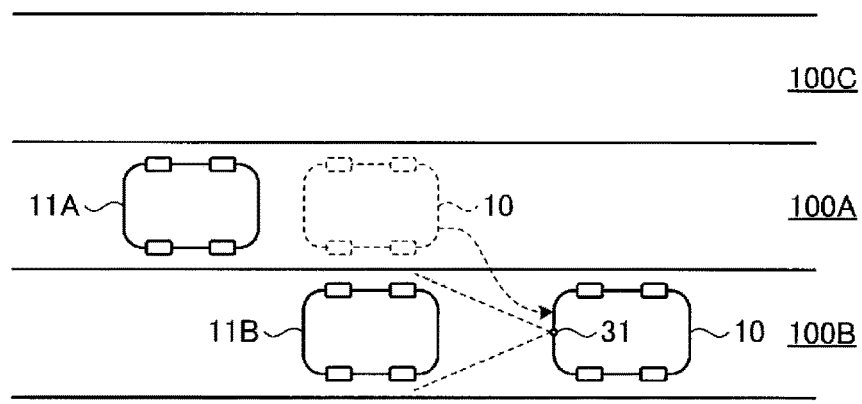
FIG. 19 is a diagram schematically illustrating an example of operations performed by the host vehicle according to the second embodiment.

The host vehicle 10 that was in the straight traveling state changes to the non-straight traveling state in order to carry out the lane change (step SB4). As a result, the host vehicle 10 completes the lane change from the lane 100A to the lane 100B. After the lane change is complete, the driver of the host vehicle 10 operates the steering operation unit 20 such that the host vehicle 10 changes from the non-straight traveling state to the straight traveling state. As a result, as illustrated in FIG. 19, the host vehicle 10 travels in the straight traveling state in the lane 100B (step SB5).

When the lane change is complete and the host vehicle 10 has changed from the non-straight traveling state to the straight traveling state, the cancellation unit 57 outputs the cancellation signal that cancels the operation signal outputted from the direction indicator operation unit 22. As a result, the direction indicators 18 are deactivated and the direction indicator operation unit 22 is returned to the neutral position.

In the present embodiment, the rear detection device control unit 56 switches the second detector 32 in the active state to the inactive state on the basis of the cancellation signal outputted from the cancellation unit 57. The rear detection device control unit 56 keeps the first detector 31 in the active state both before the operation signal from the direction indicator operation unit 22 is outputted and after the cancellation signal from the cancellation unit 57 has been outputted. In other words, the first detector 31 remains active in both the straight traveling state and the non-straight traveling state. On the other hand, the second detector 32 is in the active state in a period when the host vehicle 10 travels in the non-straight traveling state in order to make the lane change, but is in the inactive state in a period when the host vehicle 10 travels in the straight traveling state. As a result, as illustrated in FIG. 19, in the lane 100B, the first detector 31 in the straight traveling state of the host vehicle 10 is in the active state, and the second detector 32 and the third detector 33 are in the inactive state.

Note that when the host vehicle 10 makes a lane change, the steering operation unit 20 is operated such that the host vehicle 10 changes from the non-straight traveling state to the straight traveling state. The rear detection device control unit 56 may determine that the host vehicle 10 has changed from the non-straight traveling state to the straight traveling state (that the lane change is complete) on the basis of the operation amount of the steering operation unit 20 and switch the second detector 32 from the active state to the inactive state.

The rear detection device control unit 56 keeps the first detector 10 in the active state both before the host vehicle 10 changes from the straight traveling state to the non-straight traveling state and after the host vehicle 10 has changed from the non-straight traveling state to the straight traveling state. The first detector 31 remains active in both the straight traveling state and the non-straight traveling state. The second detector 32 is in the active state in a period when the host vehicle 10 travels in the non-straight traveling state in order to make the lane change, but is in the inactive state in a period when the host vehicle 10 travels in the straight traveling state.

The foregoing has described a case where the host vehicle 10 turns (changes lanes) to the right. The same also applies in the case where the host vehicle 10 turns (changes lanes) to the left. When the host vehicle 10 is in the straight traveling state, the first detector 31 is in the active state, and the second detector 32 and the third detector 33 are in the inactive state. When the host vehicle 10 turns to the left and travels in the non-straight traveling state in order to change lanes from the lane 100A to an immediate left lane 100C, the first detector 31 and the third detector 33 are in the active state and the second detector 32 is in the inactive state. As a result of the direction indicator operation unit 22 being operated when the host vehicle 10 changes lanes from the lane 100A to the immediate left lane 100C, the rear detection device control unit 56 switches the third detector 33 in the inactive state to the active state on the basis of the operation signal outputted from the direction indicator operation unit 22. Additionally, as a result of the steering operation unit 20 being operated when the host vehicle 10 changes lanes from the lane 100A to the immediate left lane 100C, the rear detection device control unit 56 switches the third detector 33 in the inactive state to the active state on the basis of the operation amount of the steering operation unit 20.

Because the third detector 33 is switched from the inactive state to the active state, when the host vehicle 10 changes lanes from the lane 100A to the lane 100C, the presence/absence of an object (the third following vehicle 11C) to the rear-left of the host vehicle 10 is detected. For example, in the case where the third following vehicle 11C in the lane 100C has been detected by the third detector 33, the warning device 7 is activated. The third following vehicle 11C is cautioned by the external warning device 72 being activated. The driver of the host vehicle 10 is cautioned by the internal warning device 71 being activated. The driver may cancel the lane change from the lane 100A to the lane 100C, for example.

After the lane change from the lane 100A to the lane 100C is complete, the driver of the host vehicle 10 operates the steering operation unit 20 such that the host vehicle 10 changes from the non-straight traveling state to the straight traveling state. As a result, the host vehicle 10 travels in the straight traveling state in the lane 100C. Additionally, when the lane change is complete and the host vehicle 10 has changed from the non-straight traveling state to the straight traveling state, the cancellation unit 57 outputs the cancellation signal that cancels the operation signal outputted from the direction indicator operation unit 22. As a result, the direction indicators 18 are deactivated and the direction indicator operation unit 22 is returned to the neutral position. In the lane 100C, the first detector 31 in the straight traveling state of the host vehicle 10 is in the active state, and the second detector 32 and the third detector 33 are in the inactive state.

As described thus far, according to the present embodiment, at least one of the second detector 32 and the third detector 33, which are in the inactive state, is switched to the active state on the basis of the operation signal outputted from the direction indicator operation unit 22. As a result, the generation of unnecessary warnings can be suppressed.

In the case where the host vehicle 10 is traveling in the straight traveling state in the lane 100A on a road having a plurality of lanes (100A, 100B, and 100C), there is a possibility of a collision with the first following vehicle 11A directly behind, but there is only a low possibility of a collision with the second following vehicle 11B to the rear-right, which travels in the lane 100B, and with the third following vehicle 11C to the rear-left, which travels in the lane 100C. If, when the host vehicle 10 is in the straight traveling state, the second detector 32 and the third detector 33 are put in the active state in addition to the first detector 31, the second detector 32 will detect the second following vehicle 11B traveling in the immediate right lane 100B and the third detector 33 will detect the third following vehicle 11C traveling in the immediate left lane 100C. In a situation where the host vehicle 10 is traveling in the straight traveling state, the second following vehicle 11B is traveling in the straight traveling state in the immediate right lane 100B, and the third following vehicle 11C is traveling in the straight traveling state in the immediate left lane 100C, the possibility of a collision between the host vehicle 10 and the second following vehicle 11B, and between the host vehicle 10 and the third following vehicle 11C, is low. Despite the possibility of a collision being low, the second warning will be generated if the second following vehicle 11B is present in the second detection range 32S of the second detector 32, and the third warning will be generated if the third following vehicle 11C is present in the third detection range 33S of the third detector 33. The second warning and the third warning are unnecessary warnings in this case. A state where the direction indicator operation unit 22 is not being operated includes the host vehicle 10 being in the straight traveling state. Setting the second detector 32 and the third detector 33 to the inactive state in a state where the direction indicator operation unit 22 is not being operated suppresses the generation of unnecessary warnings. On the other hand, in the case where the host vehicle 10 changes lanes to the immediate right lane 100B or the immediate left lane 100C, the possibility of a collision with the second following vehicle 11B traveling in the immediate right lane 100B or with the third following vehicle 11C traveling in the immediate left lane 100C increases. In the case where the host vehicle 10 changes lanes to the immediate right lane 100B or the immediate left lane 100C, the direction indicator operation unit 22 is operated. In the case where the host vehicle 10 changes lanes to the immediate right lane 100B, the direction indicator operation unit 22 is operated such that the direction indicators 18 on the right are activated. By switching the second detector 32 in the inactive state from the inactive state to the active state on the basis of the operation signal, the second following vehicle 11B in the immediate right lane 100B can be detected using the second detector 32. In the case where the host vehicle 10 changes lanes to the immediate left lane 100C, the direction indicator operation unit 22 is operated such that the direction indicators 18 on the left are activated. By switching the third detector 33 in the inactive state from the inactive state to the active state on the basis of the operation signal, the third following vehicle 11C in the immediate left lane 100C can be detected using the third detector 33. As a result, in the case where the host vehicle 10 changes lanes to the immediate right lane 100B, a collision between the host vehicle 10 and the second following vehicle 11B can be prevented. In the case where the host vehicle 10 changes lanes to the immediate left lane 100C, a collision between the host vehicle 10 and the third following vehicle 11C can be prevented.

In the present embodiment, when the host vehicle 10 changes from the non-straight traveling state to the straight traveling state, the operation signal outputted from the direction indicator operation unit 22 is canceled. When the operation signal is canceled, at least one of the second detector 32 and the third detector 33, which are in the active state, is switched to the inactive state. As a result, the generation of unnecessary warnings can be suppressed.

When the host vehicle 10 changes lanes to the immediate right lane 100B, the host vehicle 10 moves into the immediate right lane 100B as a result of the steering operation unit 20 being operated such that the host vehicle 10 changes from the straight traveling state to the non-straight traveling state. After moving into the immediate right lane 100B, the host vehicle 10 changes from the non-straight traveling state to the straight traveling state, and thus travels in the immediate right lane 100B in the straight traveling state. Generally, when the host vehicle 10 changes lanes from lane 100A to the immediate right lane 100B, the direction indicator operation unit 22 is operated and the direction indicators 18 are activated. The steering operation unit 20 is operated, the host vehicle 10 changes from the straight traveling state to the non-straight traveling state, and the lane change is carried out. After the lane change is complete, the steering operation unit 20 is operated such that the host vehicle 10 changes from the non-straight traveling state to the straight traveling state. As a result, the host vehicle 10 travels in the immediate right lane 100B in a straight traveling state. Meanwhile, the operation signal outputted from the direction indicator operation unit 22 is canceled, and the direction indicators 18 of the host vehicle 10 traveling in the immediate right lane 100B in the straight traveling state are deactivated. The same applies when the host vehicle 10 changes lanes to the immediate left lane 100C. When the host vehicle 10 travels in the immediate right lane 100B or the immediate left lane 100C in the straight traveling state, the possibility of a collision with the first following vehicle 11A traveling in the lane 100A, in which the host vehicle 10 was traveling earlier, is low. Despite the possibility of a collision being low, an unnecessary warning may be generated if the second detector 32 and the third detector 33 are in the active state. When the cancellation signal is outputted from the cancellation unit 57, at least one of the second detector 32 and the third detector 33, which are in the active state, is switched to the inactive state, which suppresses the generation of unnecessary warnings.

In the present embodiment, the rear detection device control unit 56 keeps the first detector 31 in the active state both before the operation signal from the direction indicator operation unit 22 is outputted and after the cancellation signal from the cancellation unit 57 has been outputted. As a result, the following vehicle 11 directly behind can continue to be detected using the first detector 31.

In the present embodiment, when it is determined that the host vehicle 10 has changed from the straight traveling state to the non-straight traveling state on the basis of the operation amount of the steering operation unit 20, the rear detection device control unit 56 switches at least one of the second detector 32 and the third detector 33, which are in the inactive state, to the active state. As a result, the generation of unnecessary warnings can be suppressed.

In the case where the host vehicle 10 changes lanes to the immediate right lane 100B or the immediate left lane 100C, the steering operation unit 20 is operated. In the case where the host vehicle 10 changes lanes to the immediate right lane 100B, the steering operation unit 20 is operated such that the host vehicle 10 turns to the right. By switching the second detector 32 in the inactive state from the inactive state to the active state on the basis of the operation amount of the steering operation unit 20, the second following vehicle 11B in the immediate right lane 100B can be detected using the second detector 32. In the case where the host vehicle 10 changes lanes to the immediate left lane 100C, the steering operation unit 20 is operated such that the host vehicle 10 turns to the left. By switching the third detector 33 in the inactive state from the inactive state to the active state on the basis of the operation amount of the steering operation unit 20, the third following vehicle 11C in the immediate left lane 100C can be detected using the third detector 33. As a result, in the case where the host vehicle 10 changes lanes to the immediate right lane 100B, a collision between the host vehicle 10 and the second following vehicle 11B can be prevented. In the case where the host vehicle 10 changes lanes to the immediate left lane 100C, a collision between the host vehicle 10 and the third following vehicle 11C can be prevented.

In the present embodiment, when it is determined that the host vehicle 10 has changed from the non-straight traveling state to the straight traveling state on the basis of the operation amount of the steering operation unit 20, the rear detection device control unit 56 switches at least one of the second detector 32 and the third detector 33, which are in the active state, to the inactive state. As a result, the generation of unnecessary warnings can be suppressed.

When the host vehicle 10 changes lanes to the immediate right lane 100B, the host vehicle 10 moves into the immediate right lane 100B as a result of the steering operation unit 20 being operated such that the host vehicle 10 changes from the straight traveling state to the non-straight traveling state. After moving to the immediate right lane 100B, the host vehicle 10 changes from the non-straight traveling state to the straight traveling state, and thus travels in the immediate right lane 100B in the straight traveling state. Generally, when the host vehicle 10 changes lanes from the lane 100A to the immediate right lane 100B, the steering operation unit 20 is operated, the host vehicle 10 changes from the straight traveling state to the non-straight traveling state, and the lane change is carried out. After the lane change is complete, the steering operation unit 20 is operated such that the host vehicle 10 changes from the non-straight traveling state to the straight traveling state. As a result, the host vehicle 10 travels in the immediate right lane 100B in the straight traveling state. The same applies when the host vehicle 10 changes lanes to the immediate left lane 100C. When the host vehicle 10 travels in the immediate right lane 100B or the immediate left lane 100C in the straight traveling state, the possibility of a collision with the first following vehicle 11A traveling in the lane 100A, in which the host vehicle 10 was traveling earlier, is low. Despite the possibility of a collision being low, an unnecessary warning may be generated if the second detector 32 and the third detector 33 are in the active state. When it has been determined, after the host vehicle 10 has changed lanes, that the host vehicle 10 is traveling in the post-change lane 100B or 100C in the straight traveling state, at least one of the second detector 32 and the third detector 33, which are in the active state, is switched to the inactive state, which suppresses the generation of unnecessary warnings.

In the present embodiment, the rear detection device control unit 56 keeps the first detector 31 in the active state both before the host vehicle 10 changes from the straight traveling state to the non-straight traveling state and after the host vehicle 31 has changed from the non-straight traveling state to the straight traveling state. As a result, the following vehicle 11 directly behind can continue to be detected using the first detector 31.

Third Embodiment

A third embodiment will now be described. In the following descriptions, constituent elements identical to those in the above-described embodiments will be given the same reference signs, and descriptions thereof will be simplified or omitted.

Figure 20:
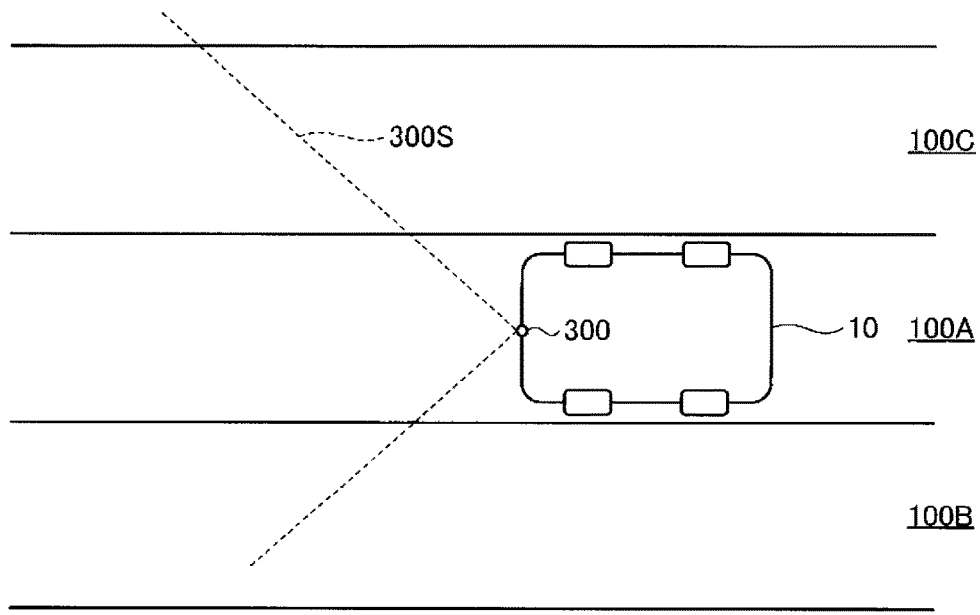
FIG. 20 is a diagram schematically illustrating an example of a rear detection device according to a third embodiment.

FIG. 20 is a diagram illustrating an example of a rear detection device 300 according to the present embodiment. In the above-described embodiments, the rear detection device 30 has a plurality of detectors (31, 32, and 33). As illustrated in FIG. 20, the rear detection device 300 may be constituted of a single detector. The rear detection device 300 has a detection range 300S. In the case where the detection range 300S is broad, the rear detection device 300 can detect the first following vehicle 11A, the second following vehicle 11B, and the third following vehicle 11C with a single detector. As described above, in addition to whether or not an object is present, the radar device is capable of detecting a relative position of the object (a relative distance and orientation) and a relative velocity of the object. In the case where the rear detection device 300 includes a radar device, the rear detection device 300 can distinguish between the first following vehicle 11A, the second following vehicle 11B, and the third following vehicle 11C even if the first following vehicle 11A, the second following vehicle 11B, and the third following vehicle 11C are all present in the detection range 300S at the same time. Accordingly, on the basis of the detection result from the rear detection device 300, the computation processing unit 51 can output the presence/absence of the possibility of a collision between the host vehicle 10 and the first following vehicle 11A approaching the host vehicle 10 from directly behind, the presence/absence of the possibility of a collision between the host vehicle 10 and the second following vehicle 11B approaching the host vehicle 10 from the rear-right, and the presence/absence of the possibility of a collision between the host vehicle 10 and the third following vehicle 11C approaching the host vehicle 10 from the rear-left.

Note that the rear detection device 300 may include at least one of a laser scanner, a three-dimensional rangefinder, and an imaging device (camera). The rear detection device 300 may have a single detection range 300S. The rear detection device 300 can distinguish between the first following vehicle 11A, the second following vehicle 11B, and the third following vehicle 11C even if the first following vehicle 11A, the second following vehicle 11B, and the third following vehicle 11C are all present in the detection range 300S at the same time.

Fourth Embodiment

A fourth embodiment will now be described. In the following descriptions, constituent elements identical to those in the above-described embodiment will be given the same reference signs, and descriptions thereof will be simplified or omitted.

Figure 21:
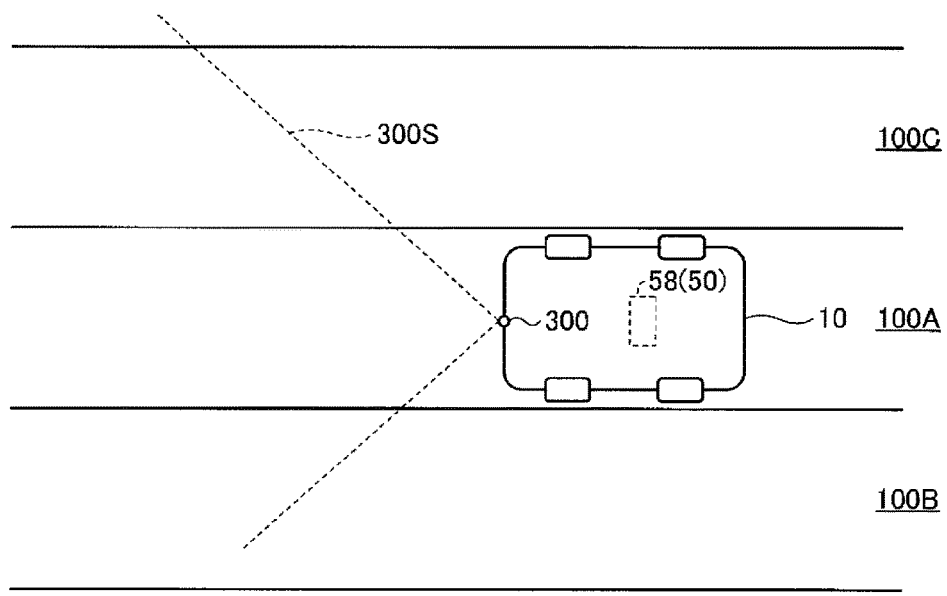
FIG. 21 is a diagram illustrating an example of a vehicle according to a fourth embodiment.

FIG. 21 is a diagram schematically illustrating an example of the host vehicle 10 according to the present embodiment. The host vehicle 10 includes the rear detection device 300 such as that described with reference to FIG. 20. The rear detection device 300 has the detection range 300S in which an object directly behind, an object to the rear-right, and an object to the rear-left can be detected.

Figure 22:
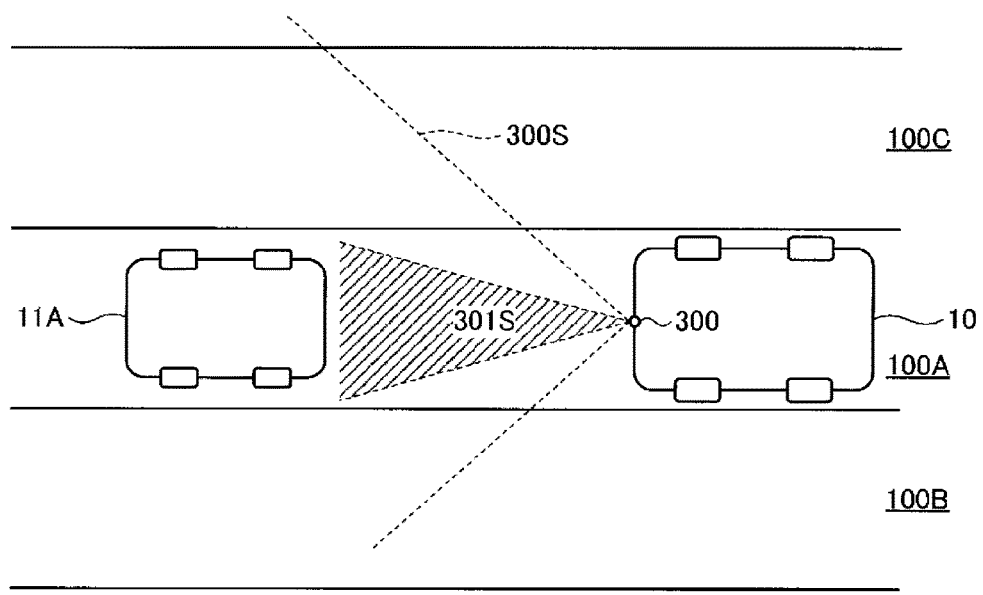
FIG. 22 is a diagram schematically illustrating an example of operations performed by a rear detection device according to the fourth embodiment.
Figure 23:
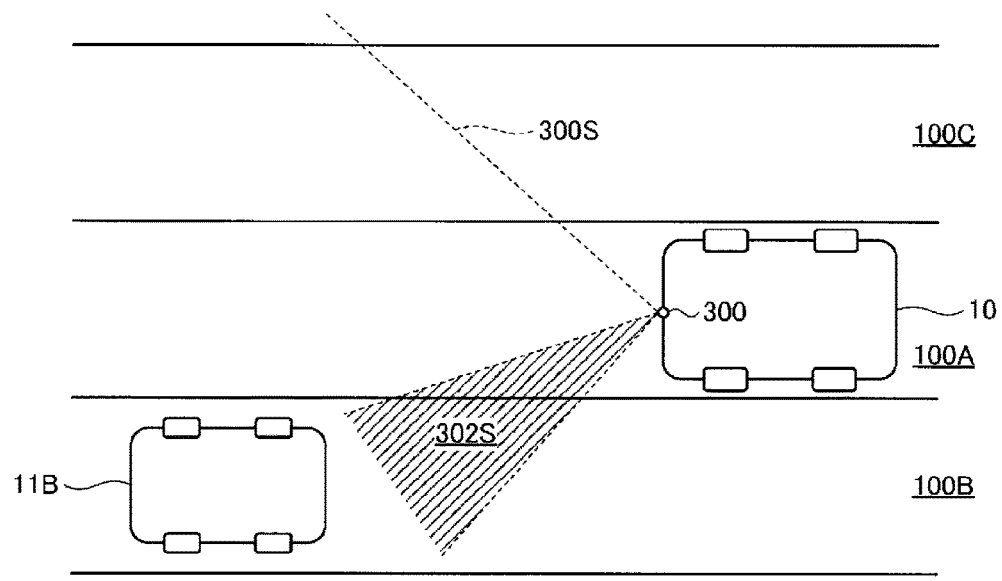
FIG. 23 is a diagram schematically illustrating an example of operations performed by the rear detection device according to the fourth embodiment.
Figure 24:
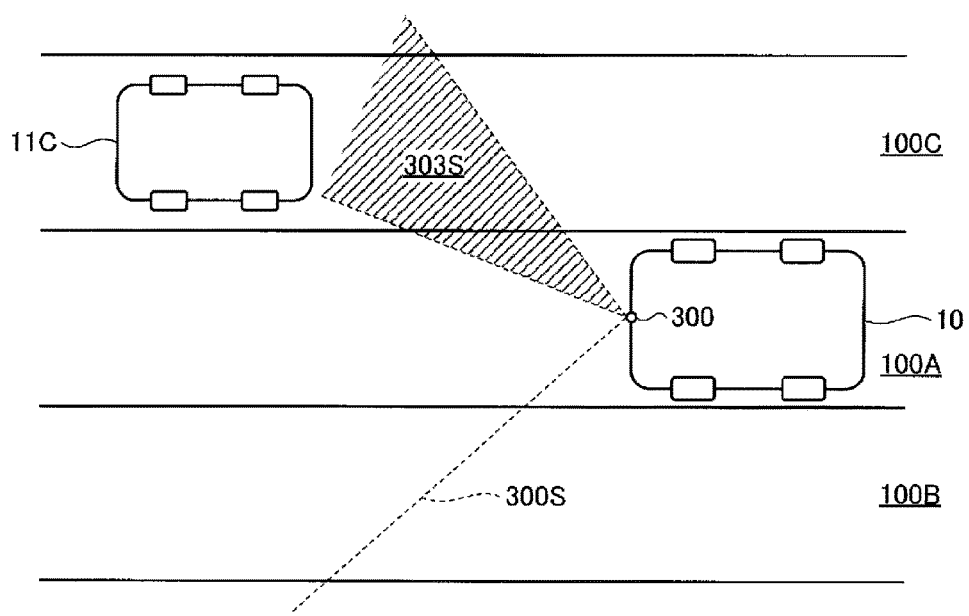
FIG. 24 is a diagram schematically illustrating an example of operations performed by the rear detection device according to the fourth embodiment.

FIGS. 22, 23, and 24 are diagrams schematically illustrating an example of operations performed by the rear detection device 300 according to the present embodiment. As illustrated in FIGS. 21, 22, 23, and 24, in the present embodiment, the control device 50 has a specific region setting unit 58 capable of setting, within the detection range 300S, a first specific region 301S extending directly behind, a second specific region 302S extending to the rear-right, and a third specific region 303S extending to the rear-left. The specific region setting unit 58 is capable of switching each of the first specific region 301S, the second specific region 302S, and the third specific region 303S from a set state to an unset state and vice versa in the detection range 300S on the basis of a detection result from the rear detection device 300.

The first specific region 301S is smaller than the detection range 300S. The first specific region 301S is set in a part of the detection range 300S. The second specific region 302S is smaller than the detection range 300S. The second specific region 302S is set in a part of the detection range 300S. The third specific region 303S is smaller than the detection range 300S. The third specific region 303S is set in a part of the detection range 300S.

The first specific region 301S, the second specific region 302S, and the third specific region 303S are set so as to be substantially non-overlapping. Note, however, that the first specific region 301S and the second specific region 302S may at least partially overlap. The first specific region 301S and the third specific region 303S may at least partially overlap. The second specific region 302S and the third specific region 303S do not overlap.

In the present embodiment, when, in the case where the first specific region 301S is in the set state and the second specific region 302S and third specific region 303S are in the unset state, an object is present in the first specific region 301S, the rear detection device 300 determines that an object is present in the first specific region 301S of the detection range 300S and outputs a detection signal indicating that object. When, in the case where the first specific region 301S is in the set state and the second specific region 302S and third specific region 303S are in the unset state, an object is present within the detection range 300S but outside the first specific region 301S, the rear detection device 300 determines that an object is not present in the detection range 300S and does not output a detection signal indicating the object (or outputs a non-detection signal).

The same applies in the case where the second specific region 302S is in the set state and the first specific region 301S and third specific region 303S are in the unset state. The same applies in the case where the third specific region 303S is in the set state and the first specific region 301S and second specific region 302S are in the unset state.

On the basis of the detection result from the rear detection device 300, the computation processing unit 51 outputs the presence/absence of the possibility of a collision with the first following vehicle 11A present in the first specific region 301S, the presence/absence of the possibility of a collision with the second following vehicle 11B present in the second specific region 302S, and the presence/absence of the possibility of a collision with the third following vehicle 11C present in the third specific region 303S.

Figure 25:
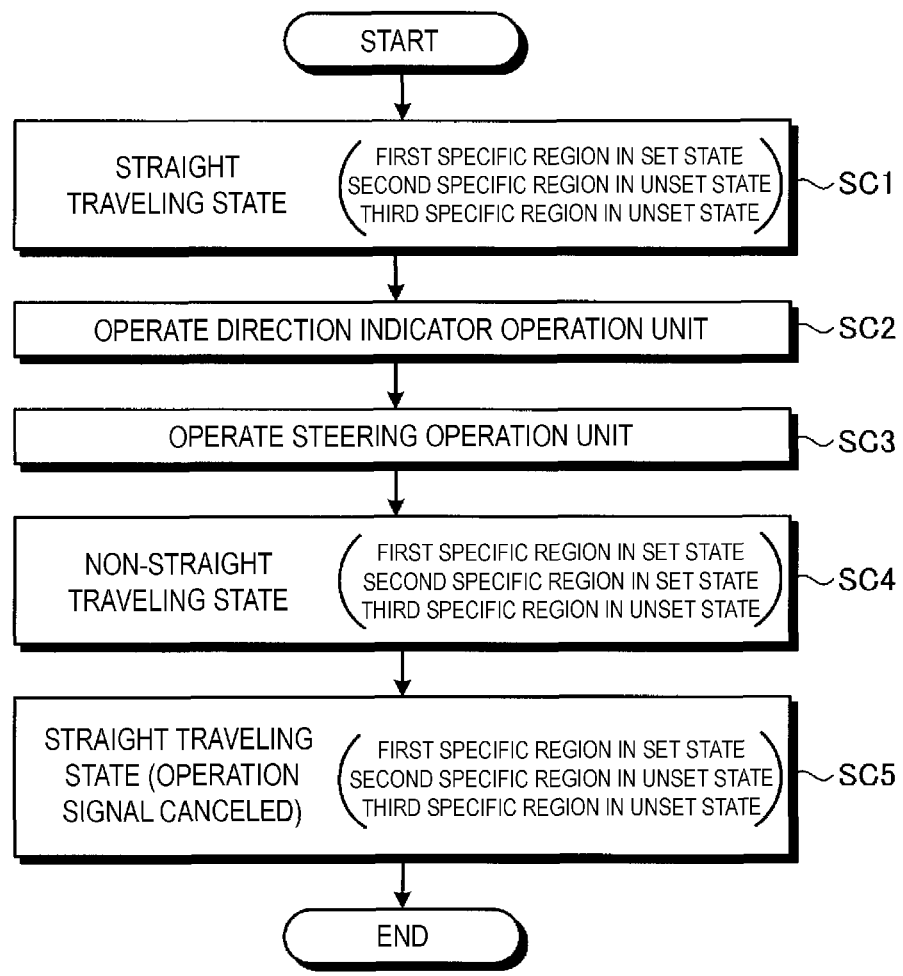
FIG. 25 is a flowchart illustrating an example of a collision avoidance method according to the fourth embodiment.
Figure 26:
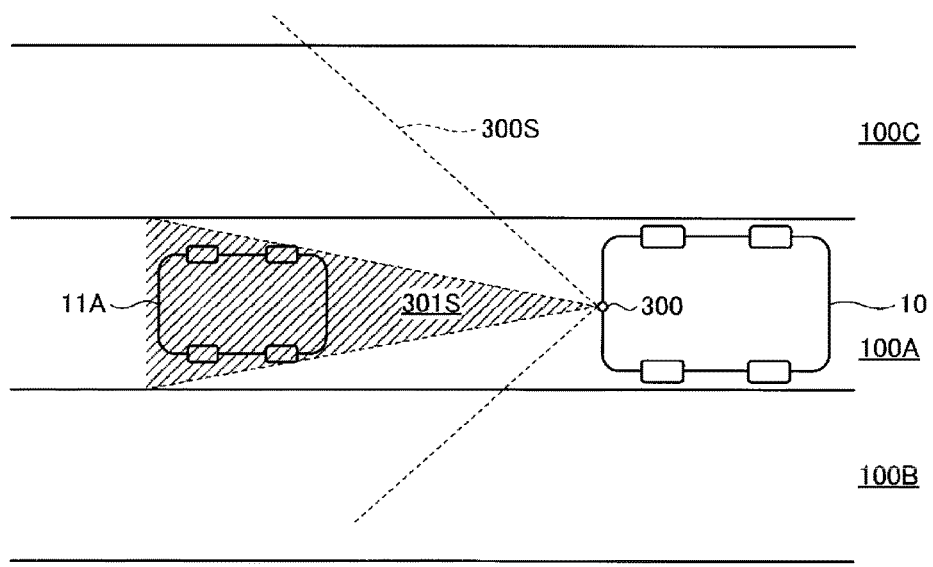
FIG. 26 is a diagram schematically illustrating an example of operations performed by a host vehicle according to the fourth embodiment.

FIG. 25 is a flowchart illustrating an example of a collision avoidance method according to the present embodiment. FIG. 26 is a diagram schematically illustrating an example of operations performed by the host vehicle 10. As illustrated in FIG. 25, when the host vehicle 10 is in the straight traveling state in the center lane 100A, the specific region setting unit 58 controls the rear detection device 300 such that the first specific region 301S is in the set state, the second specific region 302S is in the unset state, and the third specific region 303S is in the unset state (step SC1).

For example, in the case where the host vehicle 10 changes lanes to the immediate right lane 100B, the driver of the host vehicle 10 operates the direction indicator operation unit 22 (step SC2). In the case where the host vehicle 10 changes lanes from the lane 100A to the lane 100B, the direction indicator operation unit 22 is operated such that the direction indicators 18 on the right part of the host vehicle 10 are activated. The direction indicator operation unit 22 generates the operation signal in response to the direction indicator operation unit 22 being operated. The operation signal generated by the direction indicator operation unit 22 is outputted to the specific region setting unit 58.

Additionally, the driver of the host vehicle 10 operates the steering operation unit 20 such that the host vehicle 10 changes lanes from the lane 100A to the lane 100B (step SC3). The steering operation unit 20 generates an operation signal in response to the steering operation unit 20 being operated. The operation signal generated by the steering operation unit 20 includes operation amount data indicating the operation amount of the steering operation unit 20. The operation signal generated by the steering operation unit 20 is outputted to the specific region setting unit 58.

Figure 27:
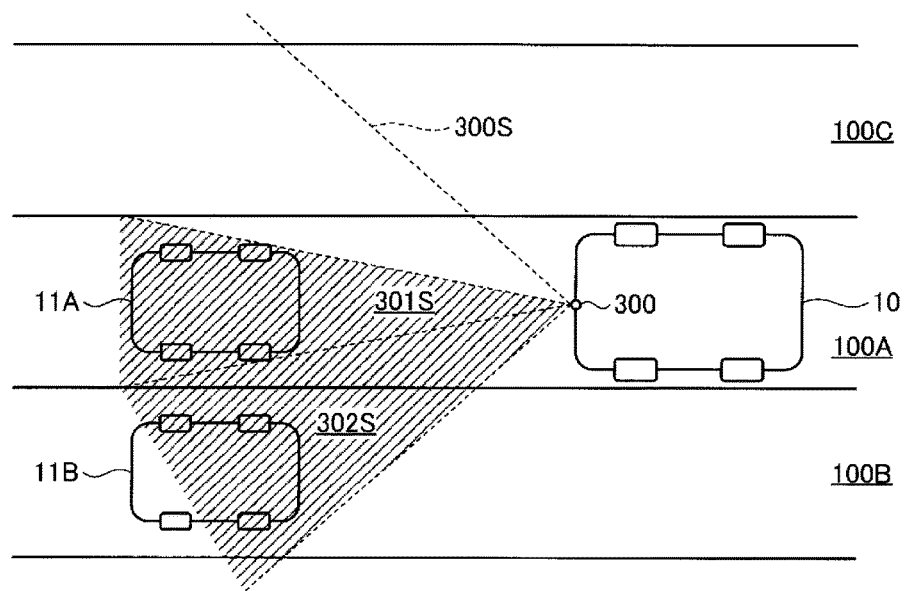
FIG. 27 is a diagram schematically illustrating an example of operations performed by the host vehicle according to the fourth embodiment.

FIG. 27 is a schematic diagram illustrating an example of the state of the host vehicle 10 after the direction indicator operation unit 22 has been operated. As illustrated in FIG. 27, the specific region setting unit 58 switches the second specific region 302S in an unset state to the set state on the basis of the operation signal outputted from the direction indicator operation unit 22. As a result, when the host vehicle 10 changes lanes from the lane 100A to the lane 100B, the presence/absence of an object (the second following vehicle 11B) to the rear-right of the host vehicle 10 is detected.

For example, in the case where the second following vehicle 11B in the lane 100B has been detected by the second specific region 302S, the warning device 7 is activated. The second following vehicle 11B is cautioned by the external warning device 72 being activated. The driver of the host vehicle 10 is cautioned by the internal warning device 71 being activated. The driver may cancel the lane change from the lane 100A to the lane 100B, for example.

Note that when the steering operation unit 20 is operated such that the host vehicle 10 changes lanes from the lane 100A to the lane 100B, the specific region setting unit 58 may, on the basis of the operation amount of the steering operation unit 20, determine that the host vehicle 10 in a straight traveling state changes from the straight traveling state to the non-straight traveling state in order to change lanes, and may switch the second specific region 302S in the unset state to the set state. As a result of this too, when the host vehicle 10 changes lanes from the lane 100A to the lane 100B, the presence/absence of an object (the second following vehicle 11B) to the rear-right of the host vehicle 10 is detected.

Figure 28:
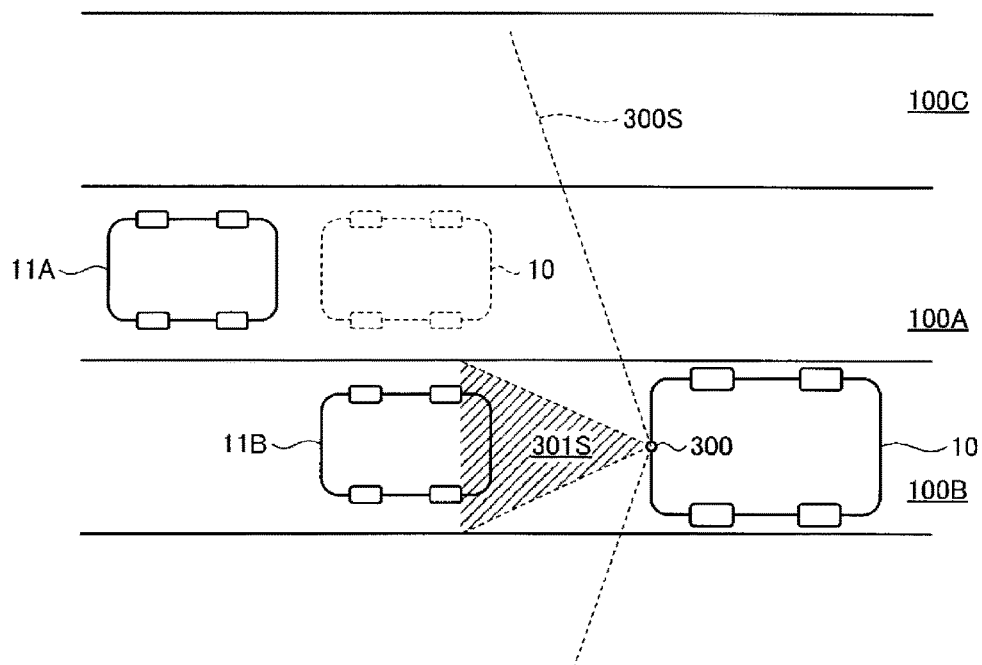
FIG. 28 is a diagram schematically illustrating an example of operations performed by the host vehicle according to the fourth embodiment.

The host vehicle 10 that was in the straight traveling state changes to the non-straight traveling state in order to carry out the lane change (step SC4). As a result, the host vehicle 10 completes the lane change from the lane 100A to the lane 100B. After the lane change is complete, the driver of the host vehicle 10 operates the steering operation unit 20 such that the host vehicle 10 changes from the non-straight traveling state to the straight traveling state. As a result, as illustrated in FIG. 28, the host vehicle 10 travels in the straight traveling state in the lane 100B (step SC5).

When the lane change is complete and the host vehicle 10 has changed from the non-straight traveling state to the straight traveling state, the cancellation unit 57 outputs the cancellation signal that cancels the operation signal outputted from the direction indicator operation unit 22. As a result, the direction indicators 18 are deactivated and the direction indicator operation unit 22 is returned to the neutral position.

In the present embodiment, the specific region setting unit 58 switches the second specific region 302S in the set state to the unset state on the basis of the cancellation signal outputted from the cancellation unit 57. The specific region setting unit 58 keeps the first specific region 301S in the set state both before the operation signal from the direction indicator operation unit 22 is outputted and after the cancellation signal from the cancellation unit 57 has been outputted. In other words, the first specific region 301S remains set in both the straight traveling state and the non-straight traveling state. On the other hand, the second specific region 302S is in the set state in a period when the host vehicle 10 travels in the non-straight traveling state in order to make the lane change, but is in the unset state in a period when the host vehicle 10 travels in the straight traveling state. As a result, as illustrated in FIG. 28, in the lane 100B, the first specific region 301S of the host vehicle 10 in the straight traveling state is in the set state, and the second specific region 302S and third specific region 303S are in the unset state.

Note that when the host vehicle 10 makes a lane change, the steering operation unit 20 is operated such that the host vehicle 10 changes from the non-straight traveling state to the straight traveling state. The specific region setting unit 58 may determine that the host vehicle 10 has changed from the non-straight traveling state to the straight traveling state (that the lane change is complete) on the basis of the operation amount of the steering operation unit 20 and switch the second specific region 302S from the set state to the unset state.

The specific region setting unit 58 keeps the first specific region 301S in the set state both before the host vehicle 10 changes from the straight traveling state to the non-straight traveling state and after the host vehicle 10 has changed from the non-straight traveling state to the straight traveling state. The first specific region 301S remains set in both the straight traveling state and the non-straight traveling state. The second specific region 302S is in the set state in a period when the host vehicle 10 travels in the non-straight traveling state in order to make the lane change, but is in the unset state in a period when the host vehicle 10 travels in the straight traveling state.

The foregoing has described a case where the host vehicle 10 turns (changes lanes) to the right. The same also applies in the case where the host vehicle 10 turns (changes lanes) to the left. When the host vehicle 10 is in the straight traveling state, the first specific region 301S is in the set state and the second specific region 302S and third specific region 303S are in the unset state. When the host vehicle 10 turns to the left and travels in the non-straight traveling state in order to change lanes from the lane 100A to the immediate left lane 100C, the first specific region 301S and the third specific region 303S are in the set state and the second specific region 302S is in the unset state. As a result of the direction indicator operation unit 22 being operated when the host vehicle 10 changes lanes from the lane 100A to the immediate left lane 100C, the specific region setting unit 58 switches the third specific region 303S in the unset state to the set state on the basis of the operation signal outputted from the direction indicator operation unit 22. Additionally, as a result of the steering operation unit 20 being operated when the host vehicle 10 changes lanes from the lane 100A to the immediate left lane 100C, the specific region setting unit 58 switches the third specific region 303S in the unset state to the set state on the basis of the operation amount of the steering operation unit 20.

Because the third specific region 303S in the unset state is switched to the set state, when the host vehicle 10 changes lanes from the lane 100A to the lane 100C, the presence/absence of an object (the third following vehicle 11C) to the rear-left of the host vehicle 10 is detected. For example, in the case where the third following vehicle 11C in the lane 100C has been detected by the third specific region 303S, the warning device 7 is activated. The third following vehicle 11C is cautioned by the external warning device 72 being activated. The driver of the host vehicle 10 is cautioned by the internal warning device 71 being activated. The driver may cancel the lane change from the lane 100A to the lane 100C, for example.

After the lane change from the lane 100A to the lane 100C is complete, the driver of the host vehicle 10 operates the steering operation unit 20 such that the host vehicle 10 changes from the non-straight traveling state to the straight traveling state. As a result, the host vehicle 10 travels in the straight traveling state in the lane 100C. Additionally, when the lane change is complete and the host vehicle 10 has changed from the non-straight traveling state to the straight traveling state, the cancellation unit 57 outputs the cancellation signal that cancels the operation signal outputted from the direction indicator operation unit 22. As a result, the direction indicators 18 are deactivated and the direction indicator operation unit 22 is returned to the neutral position. In the lane 100C, the first specific region 301S of the host vehicle 10 in the straight traveling state is in the set state, and the second specific region 302S and third specific region 303S are in the unset state.

As described thus far, according to the present embodiment, at least one of the second specific region 302S and the third specific region 303S, which are in the unset state, is switched to the set state on the basis of the operation signal outputted from the direction indicator operation unit 22. As a result, the generation of unnecessary warnings can be suppressed.

A state where the direction indicator operation unit 22 is not being operated includes the host vehicle 10 being in the straight traveling state. Setting the second specific region 302S and the third specific region 303S to the unset state in a state where the direction indicator operation unit 22 is not being operated suppresses the generation of unnecessary warnings. In the case where the host vehicle 10 changes lanes to the immediate right lane 100B, the direction indicator operation unit 22 is operated such that the direction indicators 18 on the right are activated. By switching the second specific region 302S in the unset state from the unset state to the set state on the basis of the operation signal, the second following vehicle 11B in the immediate right lane 100B can be detected using the second specific region 302S. In the case where the host vehicle 10 changes lanes to the immediate left lane 100C, the direction indicator operation unit 22 is operated such that the direction indicators 18 on the left are activated. By switching the third specific region 303S in the unset state from the unset state to the set state on the basis of the operation signal, the third following vehicle 11C in the immediate left lane 100C can be detected using the third specific region 303S. As a result, in the case where the host vehicle 10 changes lanes to the immediate right lane 100B, a collision between the host vehicle 10 and the second following vehicle 11B can be prevented. In the case where the host vehicle 10 changes lanes to the immediate left lane 100C, a collision between the host vehicle 10 and the third following vehicle 11C can be prevented.

In the present embodiment, when the host vehicle 10 changes from the non-straight traveling state to the straight traveling state, the operation signal outputted from the direction indicator operation unit 22 is canceled. When the operation signal is canceled, at least one of the second specific region 302S and the third specific region 303S, which are in the set state, is switched to the unset state. As a result, the generation of unnecessary warnings can be suppressed.

In the present embodiment, the specific region setting unit 58 keeps the first specific region 301S in the set state both before the operation signal from the direction indicator operation unit 22 is outputted and after the cancellation signal from the cancellation unit 57 has been outputted. As a result, the following vehicle 11 directly behind can continue to be detected using the first specific region 301S.

In the present embodiment, when it is determined that the host vehicle 10 has changed from the straight traveling state to the non-straight traveling state on the basis of the operation amount of the steering operation unit 20, the specific region setting unit 58 switches at least one of the second specific region 302S and the third specific region 303S, which are in the unset state, to the set state. As a result, the generation of unnecessary warnings can be suppressed.

In the present embodiment, when it is determined that the host vehicle 10 has changed from the non-straight traveling state to the straight traveling state on the basis of the operation amount of the steering operation unit 20, the specific region setting unit 58 switches at least one of the second specific region 302S and the third specific region 303S, which are in the set state, to the unset state. As a result, the generation of unnecessary warnings can be suppressed.

In the present embodiment, the specific region setting unit 58 keeps the first specific region 301S in the set state both before the host vehicle 10 changes from the straight traveling state to the non-straight traveling state and after the host vehicle 10 has changed from the non-straight traveling state to the straight traveling state. As a result, the following vehicle 11 directly behind can continue to be detected using the first specific region 301S.

Fifth Embodiment

A fifth embodiment will now be described. In the following descriptions, constituent elements identical to those in the above-described embodiment will be given the same reference signs, and descriptions thereof will be simplified or omitted.

Figure 29:
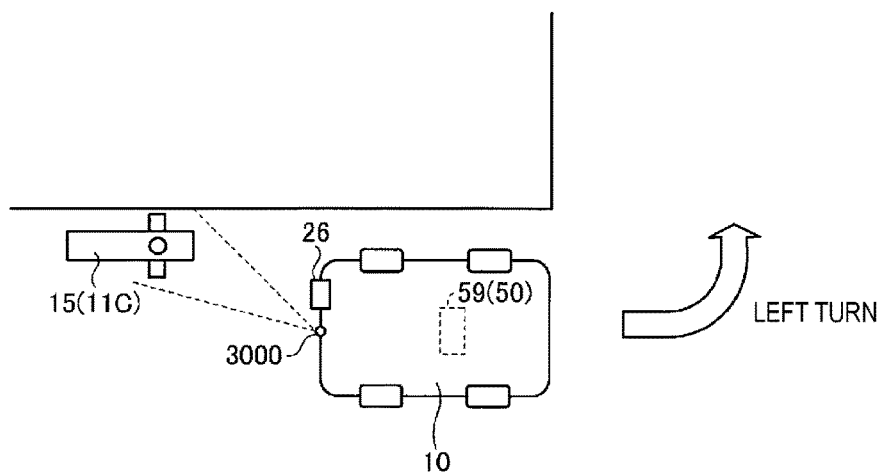
FIG. 29 is a diagram illustrating an example of a vehicle according to a fifth embodiment.

FIG. 29 is a diagram schematically illustrating an example of the host vehicle 10 according to the present embodiment. The host vehicle 10 includes a rear detection device 3000. The control device 50 has a two-wheeled vehicle determination unit 59 that determines, on the basis of a detection result from the rear detection device 3000, whether or not the third following vehicle 11C approaching the host vehicle 10 from the rear-left is a two-wheeled vehicle 15. The host vehicle 10 includes a two-wheeled vehicle warning device 26 that generates a warning for the two-wheeled vehicle 15 when the host vehicle 10 is to turn left when, on the basis of a determination result from the two-wheeled vehicle determination unit 59, it has been determined that the third following vehicle 11C approaching the host vehicle 10 from the rear-left is the two-wheeled vehicle 15.

A four-wheeled vehicle and a two-wheeled vehicle have different sizes. The two-wheeled vehicle determination unit 59 can distinguish between a four-wheeled vehicle and a two-wheeled vehicle on the basis of the detection result from the rear detection device 3000.

The two-wheeled vehicle warning device 26 generates the warning for the two-wheeled vehicle 15 when the host vehicle 10 is to turn left when it has been determined that the third following vehicle 11C approaching the host vehicle 10 from the rear-left is the two-wheeled vehicle 15. Because the warning is generated when the host vehicle 10 is to turn left, a collision with the two-wheeled vehicle 15 can be avoided when the host vehicle 10 turns to the left.

The invention claimed is:

1. A collision avoidance system comprising:
a rear detection device arranged in a host vehicle and capable of detecting an object directly behind the host vehicle, an object to rear-right of the host vehicle, and an object to rear-left of the host vehicle in a non-contact manner;
a computation processing unit that, on a basis of a detection result from the rear detection device, outputs presence/absence of a possibility of a collision between the host vehicle and a first following vehicle approaching the host vehicle from directly behind, presence/absence of a possibility of a collision between the host vehicle and a second following vehicle approaching the host vehicle from the rear-right, and presence/absence of a possibility of a collision between the host vehicle and a third following vehicle approaching the host vehicle from the rear-left;
a warning device that, on a basis of an output result from the computation processing unit, generates a first warning when there is the possibility of a collision with the first following vehicle, generates a second warning when there is the possibility of a collision with the second following vehicle, and generates a third warning when there is the possibility of a collision with the third following vehicle, wherein the warning device includes an external warning device which generates the warnings for the following vehicles;
a front detection device arranged in the host vehicle and capable of detecting an object directly in front of the host vehicle, an object to front-right of the host vehicle, and an object to front-left of the host vehicle in a non-contact manner;
a selection unit that, on the basis of detection results from the rear detection device and the front detection device, selects a space, from a space directly in front, a space to the front-right, and a space to the front-left, in which no object is present; and
a guidance unit that guides the host vehicle into the space selected by the selection unit, wherein the guidance unit includes an instruction output unit that is arranged within the host vehicle and instructs a driver of a target advancement direction of the host vehicle when there is the possibility of the collision with the following vehicles.

2. The system according to claim 1,
wherein the computation processing unit estimates
a first amount of time from a point in time when the rear detection device detects the first following vehicle to when the first following vehicle and the host vehicle collide,
a second amount of time from a point in time when the rear detection device detects the second following vehicle to when the second following vehicle and the host vehicle collide, and
a third amount of time from a point in time when the rear detection device detects the third following vehicle to when the third following vehicle and the host vehicle collide,
and on a basis of the results that is estimated, outputs
a first risk level of the host vehicle and the first following vehicle colliding,
a second risk level of the host vehicle and the second following vehicle colliding, and
a third risk level of the host vehicle and the third following vehicle colliding;
the system further comprises a comparison unit that compares the first risk level, the second risk level, and the third risk level; and
on a basis of a comparison result from the comparison unit, the warning device generates the first warning when the first risk level is highest, generates the second warning when the second risk level is highest, and generates the third warning when the third risk level is highest.

3. The system according to claim 1,
wherein the guidance unit includes
a driving control unit that controls a driving apparatus of the host vehicle.

4. The system according to claim 1,
wherein a warning generated by the warning device includes sound, an image, or both.

5. The system according to claim 1,
wherein the rear detection device includes
a first detector having a first detection range and capable of detecting an object directly behind,
a second detector having a second detection range and capable of detecting an object to the rear-right, and
a third detector having a third detection range and capable of detecting an object to the rear-left;
the system further comprises:

a rear detection device control unit capable of switching each of the first detector, the second detector, and the third detector from an active state to an inactive state and vice versa, and a direction indicator operation unit that operates a direction indicator of the host vehicle, and the rear detection device control unit switches at least one of the second detector or the third detector in the inactive state to the active state on a basis of an operation signal outputted from the direction indicator operation unit.

6. The system according to claim 5, further comprising:

a cancellation unit that outputs a cancellation signal that cancels the operation signal outputted from the direction indicator operation unit upon the host vehicle changing from a non-straight traveling state to a straight traveling state, wherein the rear detection device control unit switches at least one of the second detector or the third detector in the active state to the inactive state on a basis of the cancellation signal outputted from the cancellation unit.

7. The system according to claim 6, wherein the rear detection device control unit keeps the first detector in the active state both before the operation signal is outputted and after the cancellation signal has been outputted.

8. The system according to claim 1, wherein the rear detection device includes a first detector having a first detection range and capable of detecting an object directly behind, a second detector having a second detection range and capable of detecting an object to the rear-right, and a third detector having a third detection range and capable of detecting an object to the rear-left;

the system further comprises:

a rear detection device control unit capable of switching each of the first detector, the second detector, and the third detector from an active state to an inactive state and vice versa, and a steering operation unit that operates a steering apparatus of the host vehicle, and the rear detection device control unit switches at least one of the second detector or the third detector in the inactive state to the active state upon it being determined, on a basis of an operation amount of the steering operation unit, that the host vehicle has changed from a straight traveling state to a non-straight traveling state.

9. The system according to claim 8, wherein the rear detection device control unit switches at least one of the second detector or the third detector in the active state to the inactive state upon it being determined, on the basis of the operation amount of the steering operation unit, that the host vehicle has changed from the non-straight traveling state to the straight traveling state.

10. The system according to claim 9, wherein the rear detection device control unit keeps the first detector in the active state both before the host vehicle changes from the straight traveling state to the non-straight traveling state and after the host vehicle has changed from the non-straight traveling state to the straight traveling state.

11. The system according to claim 1, wherein the rear detection device has a detection range capable of detecting an object directly behind, an object to rear-right, and an object to rear-left;

the system further comprises:

a specific region setting unit capable of switching each of a first specific region extending directly behind, a second specific region extending to the rear-right, and a third specific region extending to the rear-left from a set state to an unset state and vice versa in the detection range, on the basis of a detection result from the rear detection device; and a direction indicator operation unit that operates a direction indicator of the host vehicle, and wherein the specific region setting unit switches at least one of the second specific region or the third specific region in the unset state to the set state on a basis of an operation signal outputted from the direction indicator operation unit; and the computation processing unit outputs presence/absence of a possibility of a collision with the first following vehicle present in the first specific region, presence/absence of a possibility of a collision with the second following vehicle present in the second specific region, and presence/absence of a possibility of a collision with the third following vehicle present in the third specific region, on the basis of the detection result from the rear detection device.

12. The system according to claim 11, further comprising:

a cancellation unit that outputs a cancellation signal that cancels the operation signal outputted from the direction indicator operation unit upon the host vehicle changing from a non-straight traveling state to a straight traveling state, wherein the specific region setting unit switches at least one of the second specific region or the third specific region in the set state to the unset state on a basis of the cancellation signal outputted from the cancellation unit.

13. The system according to claim 12, wherein the specific region setting unit keeps the first specific region in the set state both before the operation signal is outputted and after the cancellation signal has been outputted.

14. The system according to claim 1, wherein the rear detection device has a detection range capable of detecting an object directly behind, an object to the rear-right, and an object to the rear-left;

the system further comprises:

a specific region setting unit capable of switching each of a first specific region extending directly behind, a second specific region extending to the rear-right, and a third specific region extending to the rear-left from a set state to an unset state and vice versa in the detection range, on the basis of a detection result from the rear detection device; and a steering operation unit that operates a steering apparatus of the host vehicle, and wherein the specific region setting unit switches at least one of the second specific region or the third specific region in the unset state to the set state upon it being determined, on a basis of an operation amount of the steering operation unit, that the host vehicle has changed from a straight traveling state to a non-straight traveling state; and the computation processing unit outputs presence/absence of a possibility of a collision with the first following vehicle present in the first specific region, presence/absence of a possibility of a collision with the second following vehicle present in the second specific region, and presence/absence of a possibility of a collision with the third following vehicle present in the third specific region, on the basis of the detection result from the rear detection device.

15. The system according to claim 14, wherein the specific region setting unit switches at least one of the second specific region or the third specific region in the set state to the unset state upon it being determined, on the basis of the operation amount of the steering operation unit, that the host vehicle has changed from the non-straight traveling state to the straight traveling state.

16. The system according to claim 15, wherein the specific region setting unit keeps the first specific region in the set state both before the host vehicle changes from the straight traveling state to the non-straight traveling state and after the host vehicle has changed from the non-straight traveling state to the straight traveling state.

17. The system according to claim 1, further comprising:
a two-wheeled vehicle determination unit that determines whether or not the third following vehicle is a two-wheeled vehicle on the basis of the detection result from the rear detection device; and
a two-wheeled vehicle warning device that generates a warning for the two-wheeled vehicle when the host vehicle is to turn left upon it being determined, on a basis of a determination result from the two-wheeled vehicle determination unit, that the third following vehicle is a two-wheeled vehicle.

18. A collision avoidance method comprising the steps of:
detecting an object directly behind a host vehicle, an object to rear-right of the host vehicle, and an object to rear-left of the host vehicle in a non-contact manner using a rear detection device arranged in a host vehicle;
determining, on the basis of a detection result from the rear detection device, presence/absence of a possibility of a collision with a first following vehicle approaching the host vehicle from directly behind, presence/absence of a possibility of a collision with a second following vehicle approaching the host vehicle from the rear-right, and presence/absence of a possibility of a collision with a third following vehicle approaching the host vehicle from the rear-left; and
generating a first warning when there is the possibility of a collision with the first following vehicle, generating a second warning when there is the possibility of a collision with the second following vehicle, and generating a third warning when there is the possibility of a collision with the third following vehicle, on a basis of a result of the determination, using a warning device arranged in the host vehicle, wherein the warning device includes an external warning device which generates the warnings for the following vehicles;
detecting an object directly in front of the host vehicle, an object to front-right of the host vehicle, and an object to front-left of the host vehicle in a non-contact manner using a front detection device;
selecting a space, from a space directly in front, a space to the front-right, and a space to the front-left, in which no object is present, on the basis of detection results from the rear detection device and the front detection device, using a selection unit and
guiding the host vehicle into the space selected by the selection unit using a guidance unit, wherein the guidance unit includes an instruction output unit that is arranged within the host vehicle and instructs a driver of a target advancement direction of the host vehicle when there is the possibility of the collision with the following vehicles.

19. The system according to claim 1, wherein the warning device includes an internal warning device which generates a warning for a driver of the host vehicle when there is the possibility of the collision with the following vehicles.

20. The system according to claim 1, wherein the driving apparatus comprises an actuator that drives the steering apparatus, and the driving control unit guides the host vehicle into the space selected by the selection unit by controlling the actuator so as to control the steering apparatus.

21. The system according to claim 20, wherein the control of the driving apparatus by the actuator takes priority over the operation of the steering operation unit.

22. The system according to claim 21, wherein when the steering operation unit is being operated to cause the host vehicle to move into the space selected by the selection unit, the driving control unit controls the driving apparatus to assist the movement of the host vehicle into the space selected by the selection unit.

* * * * *